(12) United States Patent
Stoltzfus

(10) Patent No.: US 8,312,957 B1
(45) Date of Patent: Nov. 20, 2012

(54) APPARATUS FOR MOVING CONCRETE PUMP HOSES

(76) Inventor: Daniel R. Stoltzfus, Narvon, PA (US)

( * ) Notice: Subject to any disclaimer, the term of this patent is extended or adjusted under 35 U.S.C. 154(b) by 692 days.

(21) Appl. No.: 12/498,333

(22) Filed: Jul. 6, 2009

Related U.S. Application Data

(60) Provisional application No. 61/078,904, filed on Jul. 8, 2008.

(51) Int. Cl.
*B62D 7/15* (2006.01)
*E01C 19/12* (2006.01)

(52) U.S. Cl. .......... 180/411; 180/408; 404/101

(58) Field of Classification Search .......... 180/233, 180/234, 236, 408, 411; 280/80.1, 91.1, 280/98, 99; 404/101, 109, 110
See application file for complete search history.

(56) References Cited

U.S. PATENT DOCUMENTS

| | | | | | |
|---|---|---|---|---|---|
| 1,214,968 | A | * | 2/1917 | Steele | 180/240 |
| 2,834,605 | A | * | 5/1958 | McCollough | 180/410 |
| 3,077,354 | A | * | 2/1963 | Rateau | 280/99 |
| 3,235,283 | A | * | 2/1966 | De Voghel | 180/409 |
| 3,472,322 | A | * | 10/1969 | Barry | 172/26 |
| 3,633,702 | A | * | 1/1972 | Shaw | 180/414 |
| 3,860,175 | A | * | 1/1975 | Westerlund et al. | 239/165 |
| 3,890,055 | A | * | 6/1975 | Rochfort | 404/84.2 |
| 4,681,483 | A | * | 7/1987 | Camilleri | 405/267 |
| 4,753,549 | A | * | 6/1988 | Shook et al. | 404/75 |
| 4,950,126 | A | * | 8/1990 | Fabiano et al. | 414/590 |
| 5,219,175 | A | * | 6/1993 | Woelfel | 280/47.131 |
| 5,364,114 | A | * | 11/1994 | Petersen | 280/124.151 |
| 5,488,995 | A | * | 2/1996 | Kuwahara | 169/24 |
| 5,752,710 | A | * | 5/1998 | Roberts | 280/91.1 |
| 6,029,431 | A | * | 2/2000 | Dowler et al. | 56/14.3 |
| 6,206,127 | B1 | * | 3/2001 | Zakula et al. | 180/236 |
| 6,209,893 | B1 | * | 4/2001 | Ferris | 280/47.131 |
| 6,481,924 | B1 | * | 11/2002 | Smolders et al. | 404/105 |
| 6,491,127 | B1 | * | 12/2002 | Holmberg et al. | 180/252 |
| 6,520,642 | B1 | * | 2/2003 | Chapman | 352/243 |
| 6,588,976 | B2 | | 7/2003 | Quenzi | 404/84.8 |
| 6,623,208 | B2 | | 9/2003 | Quenzi | 404/84.8 |
| 6,668,965 | B2 | * | 12/2003 | Strong | 180/411 |
| 6,692,185 | B2 | * | 2/2004 | Colvard | 404/105 |
| 6,793,036 | B1 | * | 9/2004 | Enmeiji et al. | 180/411 |
| 6,866,113 | B2 | * | 3/2005 | Sugata | 180/253 |
| 6,883,815 | B2 | * | 4/2005 | Archer | 280/91.1 |
| 6,913,102 | B2 | * | 7/2005 | Sugata et al. | 180/253 |
| 7,191,865 | B2 | * | 3/2007 | Spark | 180/411 |
| 7,520,362 | B2 | * | 4/2009 | Wierzba et al. | 180/253 |
| 7,543,851 | B2 | * | 6/2009 | Wolfram et al. | 280/766.1 |
| 7,617,890 | B2 | * | 11/2009 | Romig | 180/6.48 |
| 7,690,685 | B2 | * | 4/2010 | Sasaoka | 280/771 |

(Continued)

*Primary Examiner* — Toan To
*Assistant Examiner* — Barry Gooden, Jr.
(74) *Attorney, Agent, or Firm* — Miller Law Group, PLLC

(57) ABSTRACT

A mobile apparatus moves a concrete pump hose over a base surface and has a wheeled frame in which the wheels are pivotable about a generally vertical pivot axis between a longitudinal orientation and a transverse orientation. Each of the front pair of wheels and the rear pair of wheels are coupled to a steering mechanism to permit independent pivotal movement of the respective pairs of wheels to provide four wheel steer of the frame. The hose is supported by front and rear horn members above the base surface and below the frame. An intermediate grappling apparatus engages the hose to affect elevation thereof onto the horn members. The horn members are split between a fixed portion and a pivotally movable portion that pivots away from the fixed portion to permit the hose to be elevated above the horn members. A boom apparatus can substitute for the grappling apparatus.

22 Claims, 23 Drawing Sheets

U.S. PATENT DOCUMENTS

| | | | |
|---|---|---|---|
| 7,798,274 B2* | 9/2010 | Wierzba et al. | 180/253 |
| 7,823,673 B2* | 11/2010 | Asogawa | 180/209 |
| 2001/0048850 A1* | 12/2001 | Quenzi et al. | 404/108 |
| 2002/0076279 A1* | 6/2002 | Quenzi et al. | 404/100 |
| 2002/0148669 A1* | 10/2002 | Sugata | 180/411 |
| 2005/0236217 A1* | 10/2005 | Koelin et al. | 180/411 |
| 2006/0140783 A1* | 6/2006 | Wolfram et al. | 417/234 |
| 2007/0168095 A1* | 7/2007 | Wierzba et al. | 701/41 |
| 2008/0093149 A1* | 4/2008 | Smolders et al. | 180/234 |
| 2009/0188740 A1* | 7/2009 | Wierzba et al. | 180/236 |
| 2010/0043159 A1* | 2/2010 | Fujiwara | 15/97.1 |
| 2011/0108347 A1* | 5/2011 | Wierzba et al. | 180/236 |

\* cited by examiner

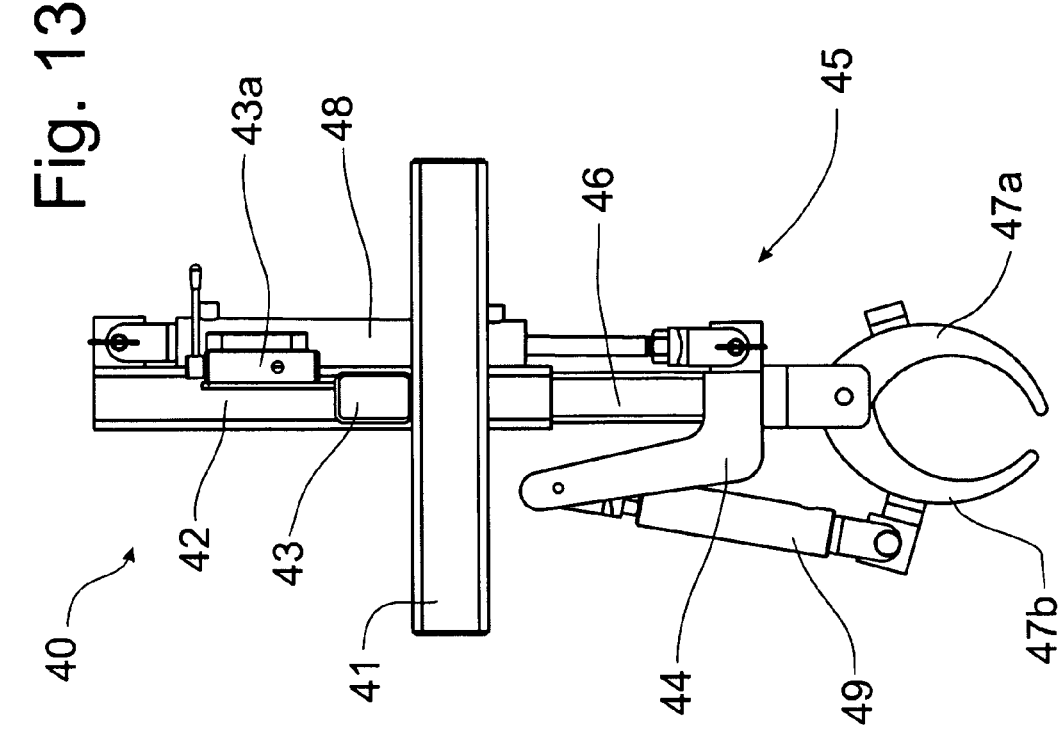
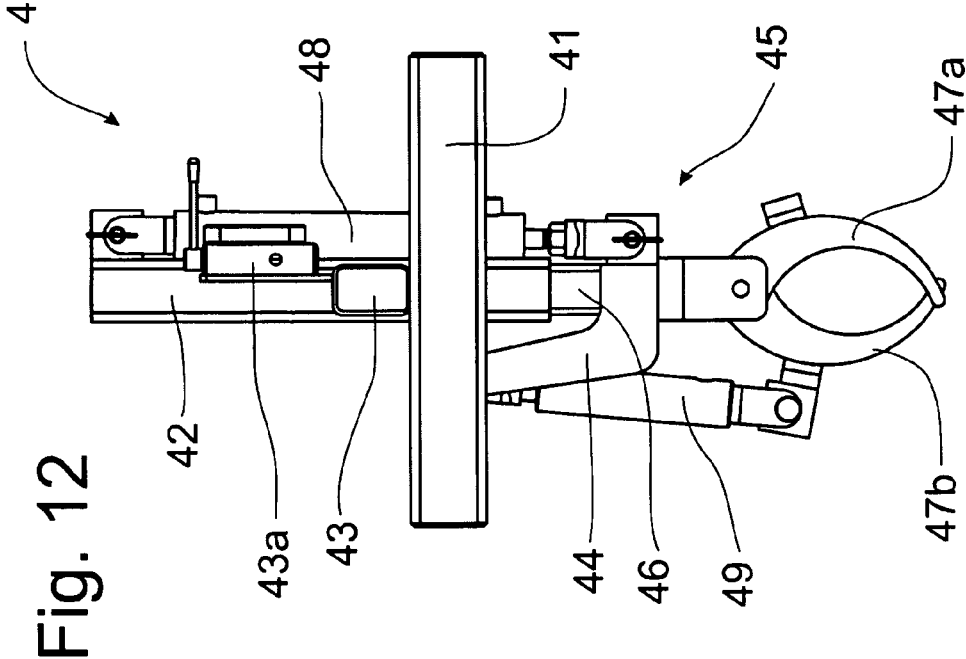

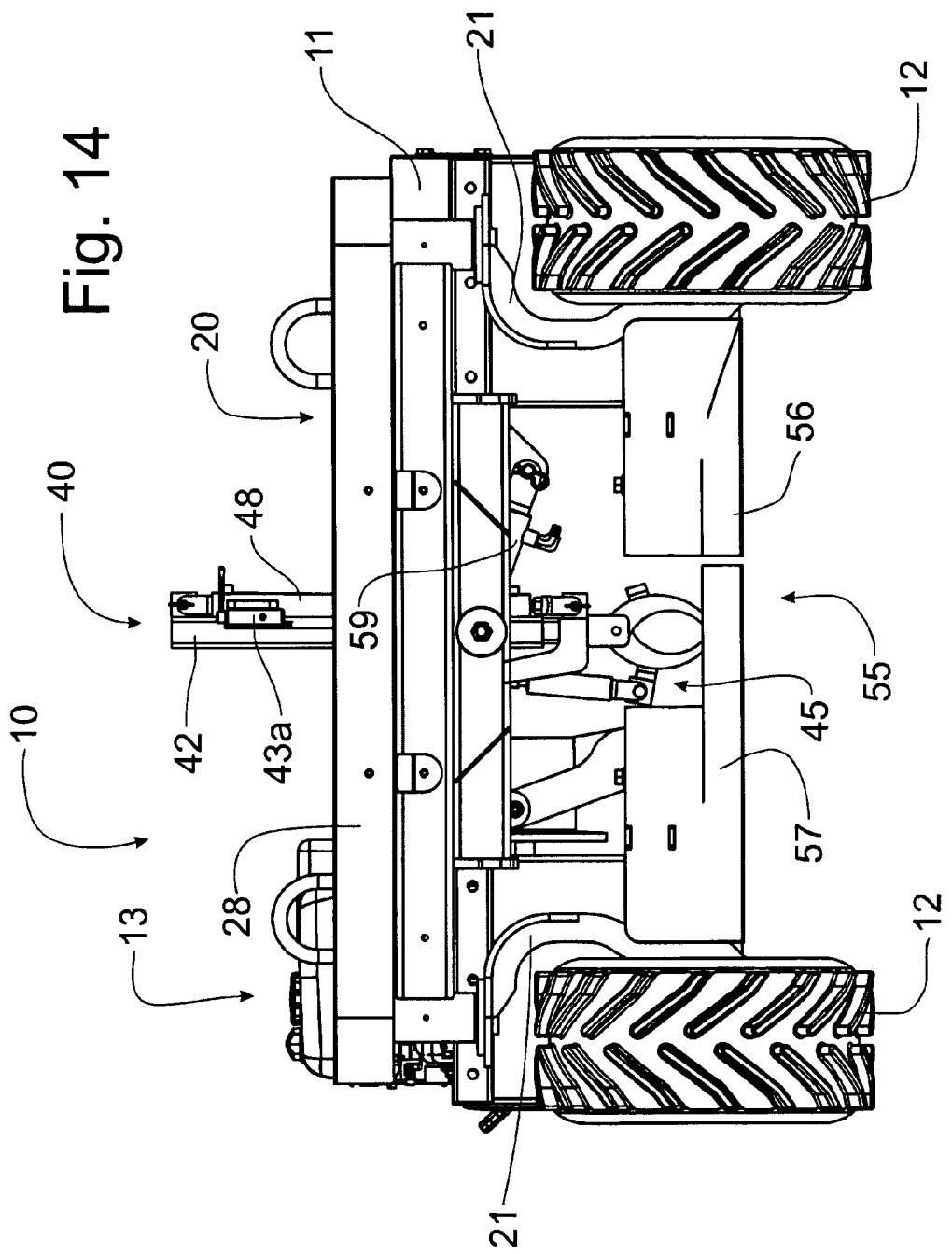

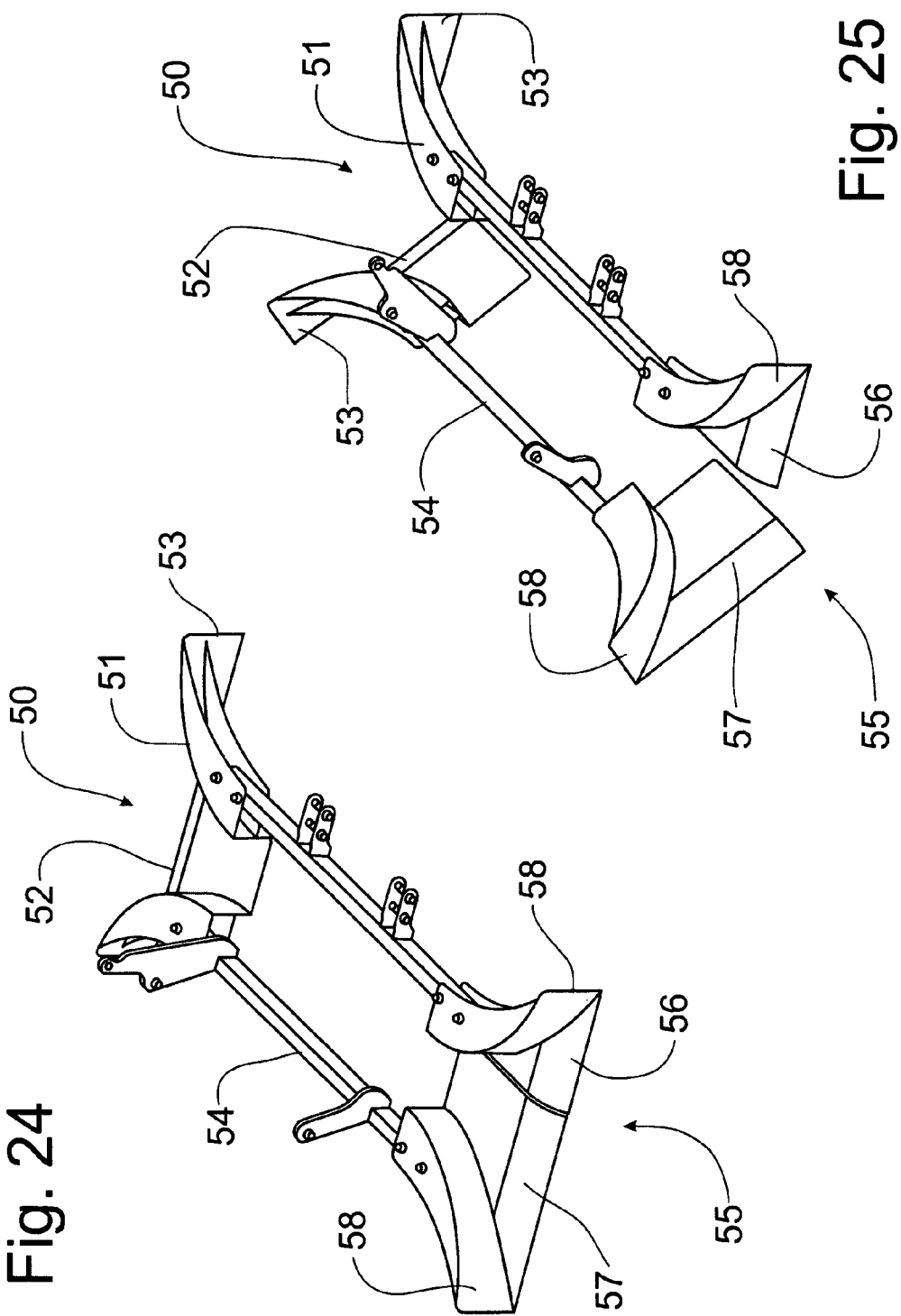

APPARATUS FOR MOVING CONCRETE PUMP HOSES

CROSS-REFERENCE TO RELATED APPLICATIONS

This application claims domestic priority on U.S. Provisional Patent Application Ser. No. 61/078,904, filed on Jul. 8, 2008, the contents of which are incorporated herein by reference.

FIELD OF THE INVENTION

This invention relates generally to devices for the placement of concrete to form a building floor and, more particularly, to an apparatus for moving the hose for conveying concrete pumped from a concrete pump truck into a low profile area where overhead obstructions preclude or limit the accessibility of the concrete pump truck.

BACKGROUND OF THE INVENTION

It is known to use a concrete pumping truck and pipe or a boom truck to place concrete at a targeted site. The boom truck incorporates boom and pipe apparatus to pump flowable concrete mixture to a remote location, which can be at a greater distance from the pumping truck or at a different elevation, such as an upper floor or a basement of a building. It is difficult to use conventional boom trucks between floors of buildings because there may not be enough clearance between the floor and the overhead structures to reach the entire floor with the articulated boom. Furthermore, the boom of the concrete pumping truck may also not be sufficiently long to reach most remote portions of the floor on which the concrete is being deposited, which would require the use of additional pipes or hoses to carry and place the concrete at those remote locations.

In areas where boom trucks cannot reach or where a concrete pumping truck is available while a boom truck is not, a movable pipe or multiple sections of pipe or hose may be connected to the concrete pump and extended in order to reach the remote portions of the floor. Although such systems are capable of reaching the remote areas from the concrete pumps, the pipes and hoses filled with concrete mixture are difficult to manipulate in order to properly place the concrete at the remote portions due to the substantial weight of the filled pipes and/or hoses. Mobile devices are known in the art for supporting the concrete filled pipes and hoses to assist in the positioning and movement of the pipes and hoses to allow an efficient placement for the concrete mixture throughout the floor.

One such mobile device for manipulating the concrete filled pipes and hoses can be found in U.S. Pat. No. 6,588,976 issued to Philip Quenzi, et al on Jul. 8, 2003, and in U.S. Pat. No. 6,623,208, issued to Philip Quenzi et al on Sep. 23, 2003. Several different embodiments of the mobile devices are disclosed in the Quenzi patents, including a four-wheeled apparatus on which the concrete pipe is affixed to the top of the chassis supported by the four wheels. The concrete pipe holding device is pivoted to the chassis to permit the movement of the wheeled apparatus across the sub grade surface of the floor on which the concrete mixture is to be deposited. The four-wheeled apparatus is steerable by turning pairs of wheels.

An alternative embodiment of the apparatus incorporates a wheel-trolley track mechanism housing orthogonally oriented wheels to provide the ability to move in alternative directions, powered in one direction and with the extension of the telescopic pipe with the rotation of the orthogonally extending wheels. The Quenzi devices support the concrete pipe over the top of the chassis, which requires that rigid pipe sections be used with the wheeled devices, even though a more flexible hose leads from the concrete pump to the rigid pipe, as is shown in the drawings. Furthermore, some of the embodiments require cooperation with an articulated or a telescopic pipe apparatus to be able to operate effectively.

It would be desirable to provide a mobile apparatus that would have great flexibility in movement over the subgrade floor surface to be able to efficiently place concrete mixture in remote portions of the floor. It would also be desirable to provide a mobile apparatus that can be operable with both flexible concrete pump hose and rigid pipe sections. It would further be desirable to provide a mobile apparatus for moving concrete pump hose and pipe that can be operated by remote control.

SUMMARY OF THE INVENTION

It is an object of this invention to overcome the disadvantages of the prior art by providing an apparatus for moving hoses of a concrete pump while being utilized to pump concrete into a confined structure.

It is another object of this invention to provide a greater range of movement for an apparatus operable to move concrete pump hoses.

It is a feature of this invention that the basic mobile apparatus can have mounted thereon optional devices for handling concrete pump hoses or for placement of the pumped concrete.

It is another feature of this invention that the mobile apparatus for handling concrete pump hoses is provided with four wheels that are rotatable about vertical axes to provide different configurations for steering the apparatus within a confined structure in which concrete is being pumped through the hoses.

It is an advantage of this invention that the front pair of wheels is rotatable about respective vertical axes independently of the rear pair of wheels.

It is another advantage of this invention that the front and rear wheels are rotatable through an angle of rotation of at least 135 degrees to enable the apparatus to move longitudinally, transversely or diagonally.

It is still another feature of this invention that all four wheels of the mobile apparatus are powered by respective hydraulic motors for rotation thereof about horizontal axes.

It is yet another feature of this invention that the front pair of wheels and the rear pair of wheels are coupled together by an endless chain having a double acting hydraulic cylinder to cause selective movement of the respective pairs of wheels about the vertical axes.

It is still another object of this invention that an optional attachment for the mobile apparatus is a grappling device operable to lower for engagement of a concrete pump hose and affect a lifting of the hose onto front and rear horns for enhanced support of the concrete pump hose.

It is another feature of this invention that the front and rear horns are divided between a fixed longitudinal portion and a pivoted longitudinal portion.

It is still another advantage of this invention that the pivoted horn portion allows the concrete hose to be elevated by the grappling attachment above the front and rear horns before pivoting underneath the elevated hose for support thereof.

It is yet another object of this invention to provide a mobile apparatus for supporting a concrete pump hose over a base surface by positioning the hose beneath the frame.

It is yet another advantage of this invention that the hose carrying mobile apparatus has a lower center of gravity than known in the prior art and, thus, is more stable in operation.

It is still another feature of this invention that the grappling apparatus and the front and rear horn members support the concrete pump hose above the base surface and below the frame.

It is yet another feature of this invention that the frame supports an engine powering a hydraulic system to provide operative power to hydraulic cylinders for operating the steering mechanisms, the pivotal movement of the horn members, the operation of the grappling apparatus and the boom apparatus, and to hydraulic motors for driving of the rotation of the wheels.

It is a further feature of this invention that the horn members are formed with arcuately flared flanges to limit the lateral displacement of the concrete pump hose relative to the horn members as the mobile apparatus transports the concrete pump hose over the base surface.

It is still a further feature of this invention that the steering mechanisms include an endless chain device entrained around sprockets affixed to the respective wheel mounting brackets so that an induced rotation of the sprockets results in a corresponding rotation of the wheel mounting brackets to affect a pivotal movement of the corresponding wheel.

It is a further advantage of this invention that the rotation of the sprockets is induced by a double acting hydraulic cylinder having a fixed position barrel.

It is another advantage of this invention that the maneuverability of an apparatus for supporting and moving a concrete pump hose is increased in comparison with the known prior art devices.

It is a further object of this invention to provide a mobile apparatus for supporting and transporting a concrete pump hose, which is durable in construction, inexpensive of manufacture, carefree of maintenance, and simple and effective in use.

These and other objects, features and advantages are accomplished according to the instant invention by providing a mobile apparatus for supporting and moving a concrete pump hose over a base surface. The mobile apparatus has a wheeled frame in which the wheels are pivotable about a generally vertical pivot axis between a longitudinal orientation and a transverse orientation. Each of the front pair of wheels and the rear pair of wheels are coupled to a steering mechanism to permit independent pivotal movement of the respective pairs of wheels to provide four wheel steer of the frame. The hose is supported by front and rear horn members above the base surface and below the frame. An intermediate grappling apparatus engages the hose to affect elevation thereof onto the horn members. The horn members are split between a fixed portion and a pivotally movable portion that pivots away from the fixed portion to permit the hose to be elevated above the horn members. A boom apparatus can substitute for the grappling apparatus.

BRIEF DESCRIPTION OF THE DRAWINGS

The advantages of this invention will be apparent upon consideration of the following detailed disclosure of the invention, especially when taken in conjunction with the accompanying drawings wherein:

FIG. 12 is a rear elevational view of the grappling attachment with the grabber claws being in the raised and closed position;

FIG. 13 is a side elevational view of the grappling attachment with the grabber claws being moved to the lowered position with the grabber claws still being in the closed position;

FIG. 14 is a rear elevational view of the mobile apparatus with the grappling attachment mounted thereon and positioned in the raised and closed orientation;

FIG. 24 is a perspective detail view of the horn apparatus showing both the movable portion and the fixed portion being in the raised, closed position for support of a concrete pump hose; and FIG. 25 is a perspective detail view similar to that of FIG. 24, but depicted the movable portion of the horn apparatus being pivoted into the opened position.

DETAILED DESCRIPTION OF THE PREFERRED EMBODIMENT

Figure 1:
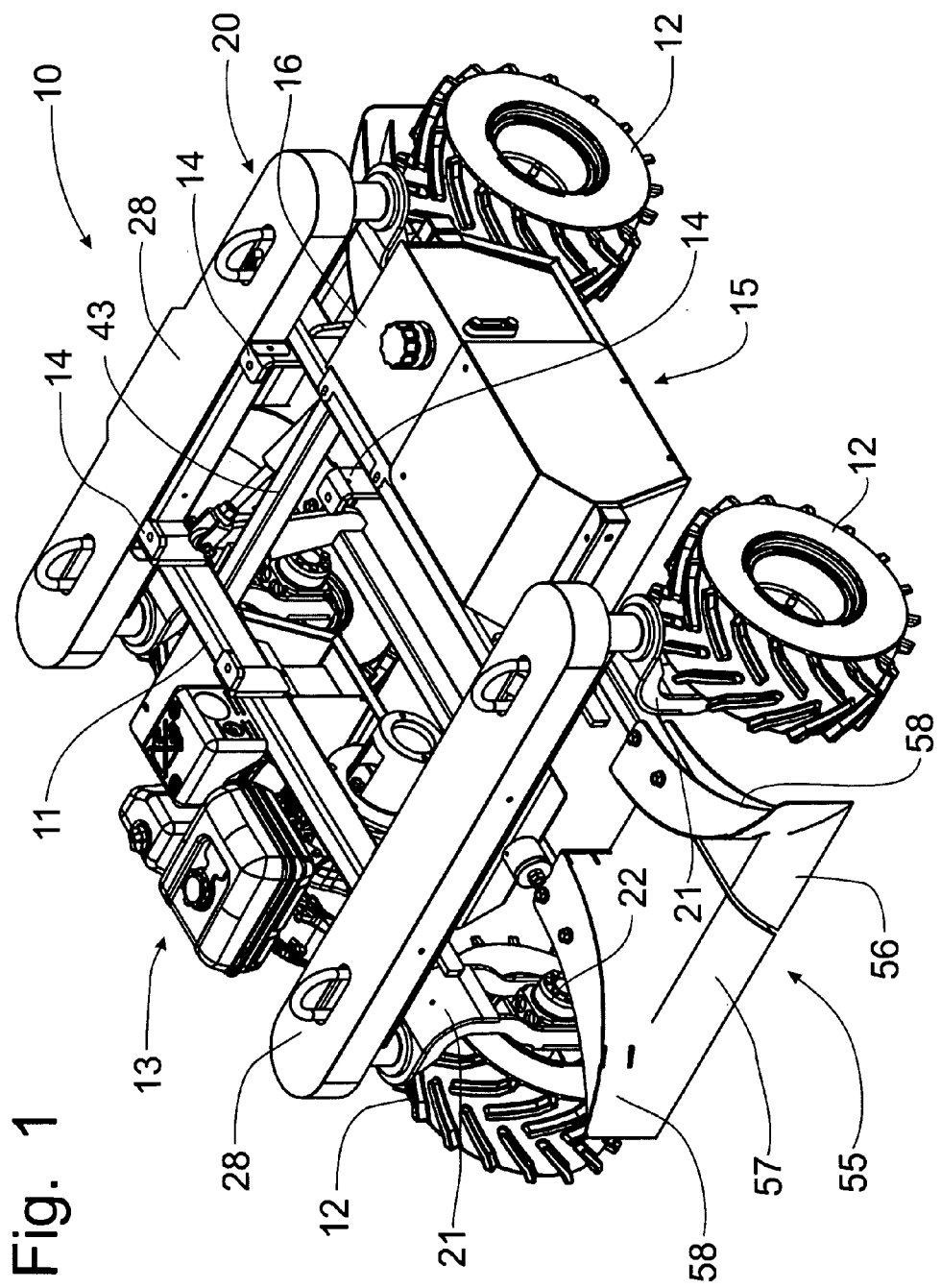
FIG. 1 is a rear perspective view of a mobile apparatus for carrying a concrete pump hose, incorporating the principles of the instant invention, the wheels being oriented in a longitudinal orientation to move the mobile apparatus in a fore-and-aft direction, all attachments being removed for purposes of clarity.
Figure 2:
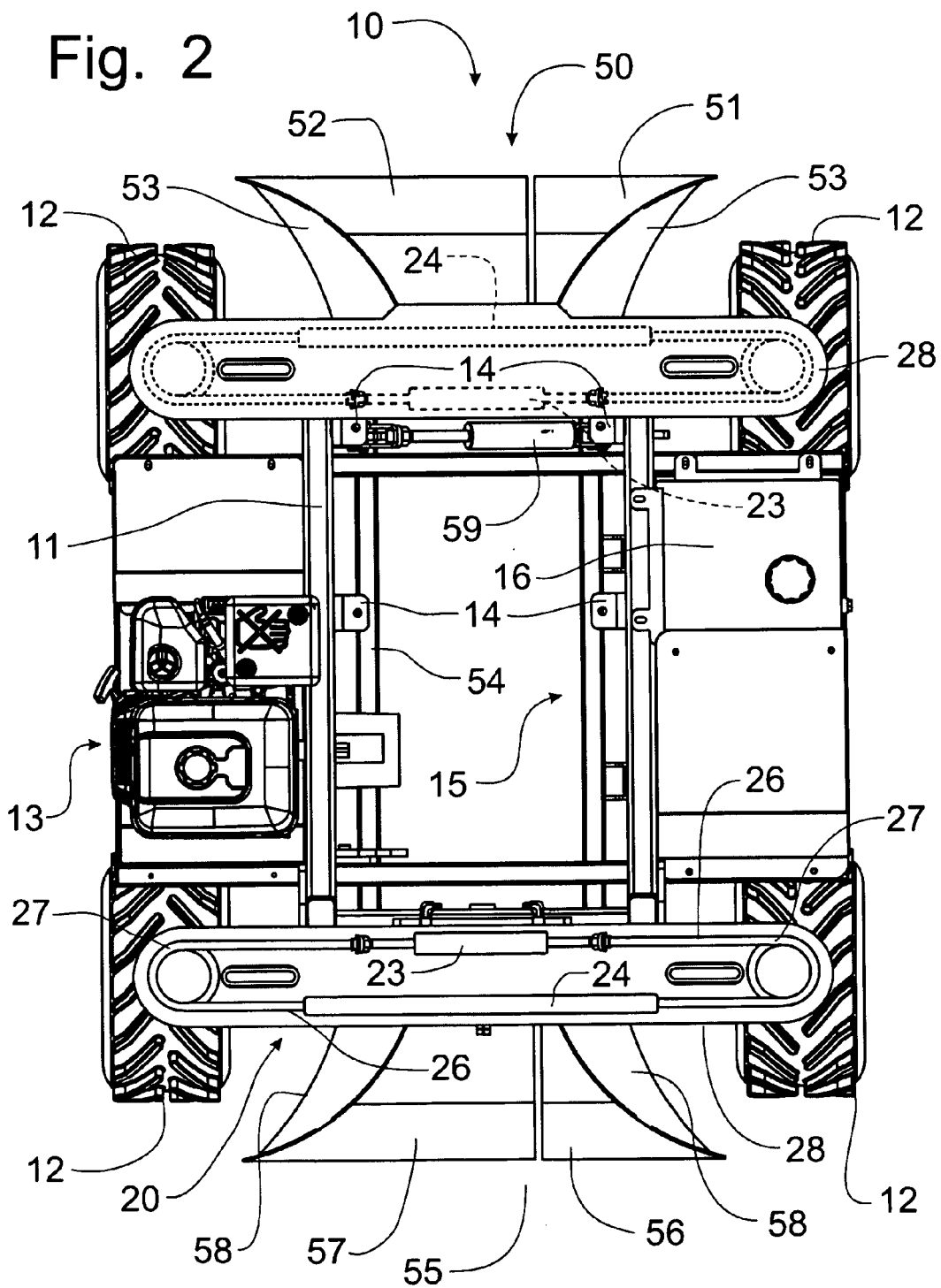
FIG. 2 is a top plan view of the mobile apparatus shown in FIG. 1, the top plate of the steering mechanism cover being removed on the rear steering mechanism for better clarity in viewing the steering mechanism, the front steering mechanism being shown in dotted lines.

Referring to FIGS. 1-6, a mobile apparatus for supporting and moving a concrete pump hose or rigid pipe incorporating the principles of the instant invention can best be seen. Any references to right, left, front and rear are made as a matter of convenience and are determined by standing at the rear of the apparatus with the engine mounted on the left side of the apparatus. The mobile apparatus 10 includes a frame 11 supported on four independently powered wheels 12. The frame 11 supports an engine 13, preferably a gasoline engine, to serve as a power plant for the operation of the apparatus 10. The frame 11 also includes an attachment mount 14, described in greater detail below for the mounting of an operable attachment device.

Each wheel 12 is supported from the frame 11 by a support bracket 21 that rotatably supports the corresponding wheel 12 about a horizontal axis of rotation. When the wheels 12 are placed into a longitudinal orientation, as depicted in FIG. 1, a hydraulic motor 22 is mounted on each support bracket 21 on the inside surface thereof. Each hydraulic motor 22 is operatively connected to the hydraulic system 15, which is powered by the engine 14, to receive a supply of hydraulic fluid under pressure therefrom to power the rotation of each respective wheel 12. Each support bracket 21 is rotatably connected to the frame 11 for movement through approximately one hundred eighty (180°) degrees of rotation about a generally vertical pivot axis which is preferably vertically aligned with the center of the corresponding wheel 12.

Each pair of front and rear wheels 12 is coupled to a steering mechanism 20 extending laterally across the frame 11 at the front and back, respectfully, of the mobile apparatus 10. Each steering mechanism 20 includes a horizontally disposed hydraulic steering cylinder 23, which is preferably a double-ended, double-acting hydraulic cylinder with the barrel secured to the frame 11. A flexible chain 26 extends from the opposing ends of the hydraulic steering cylinder 23 and wraps around a sprocket 27 mounted on the vertical axis of rotation for each corresponding support bracket 21 and being coupled thereto to affect a pivotal movement of the support bracket 21 about the vertical axis of rotation. Each chain 26 extends around the corresponding sprocket 27 and is connected to an adjustable steering link 24 that can be adjusted to maintain proper tension in the chains 26. As shown in FIGS. 1-6, a shield 28 is provided to cover the steering mechanisms 20 to prevent engagement therewith.

In operation, the steering mechanism 20 causes selective pivotal movement of the front and rear pairs of wheels 12 by pivotally rotating the support brackets 21. The hydraulic steering cylinders 23 are operatively connected to the hydraulic system 15 to receive a supply of pressurized fluid therefrom so as to be independently operable to shift selectively to the left or the right of the fixed barrel. This lateral shifting pulls the chain 26 in the direction of movement, causing the steering link 24 and the other chain 26 to move as well since the hydraulic steering cylinder 23, the steering link 24 and the two chains 26 form an endless oval path turning around the two sprockets 27. This movement of the steering mechanism 20 affects a simultaneous rotation of the sprockets 27 that, in turn, cause pivotal rotation of the support brackets 21. For adequate flexibility in steering the mobile apparatus 10, each support bracket 21 should be rotatable through an angular rotation of at least 135 degrees, though an angular rotation of 180 degrees would be preferred. An angular deflection of at least 135 degrees will enable each wheel to move from a transverse orientation to a longitudinal orientation and also through an additional 45 degrees of pivotal movement for steering in the opposite direction.

As depicted in several of the drawings, the front and rear pairs of wheels 12 are independently rotatable in a number of configurations and orientations. In FIG. 1, for example, the front and rear wheels 12 are placed into a conventional longitudinal orientation. By fully rotating the front and rear wheels 12, the wheels 12 can also be placed into a transverse orientation, as reflected in FIGS. 16, 19 and 20. In addition, the front wheels 12 and the rear wheels 12 can be rotated in opposite directions, as is depicted in FIG. 23, for example, to provide a four-wheel steering configuration for the mobile apparatus 10, as well as a rotation of the apparatus 10 about very short turning radius. Standard two-wheel steering operation can be accomplished by rotating only one of the front or rear pairs of wheels 12, as is shown in FIG. 21. Also, the front and rear wheels 12 can be rotated in a like direction, which is depicted in FIG. 22, to affect movement of the mobile apparatus 10 in either diagonal direction.

Figure 7:
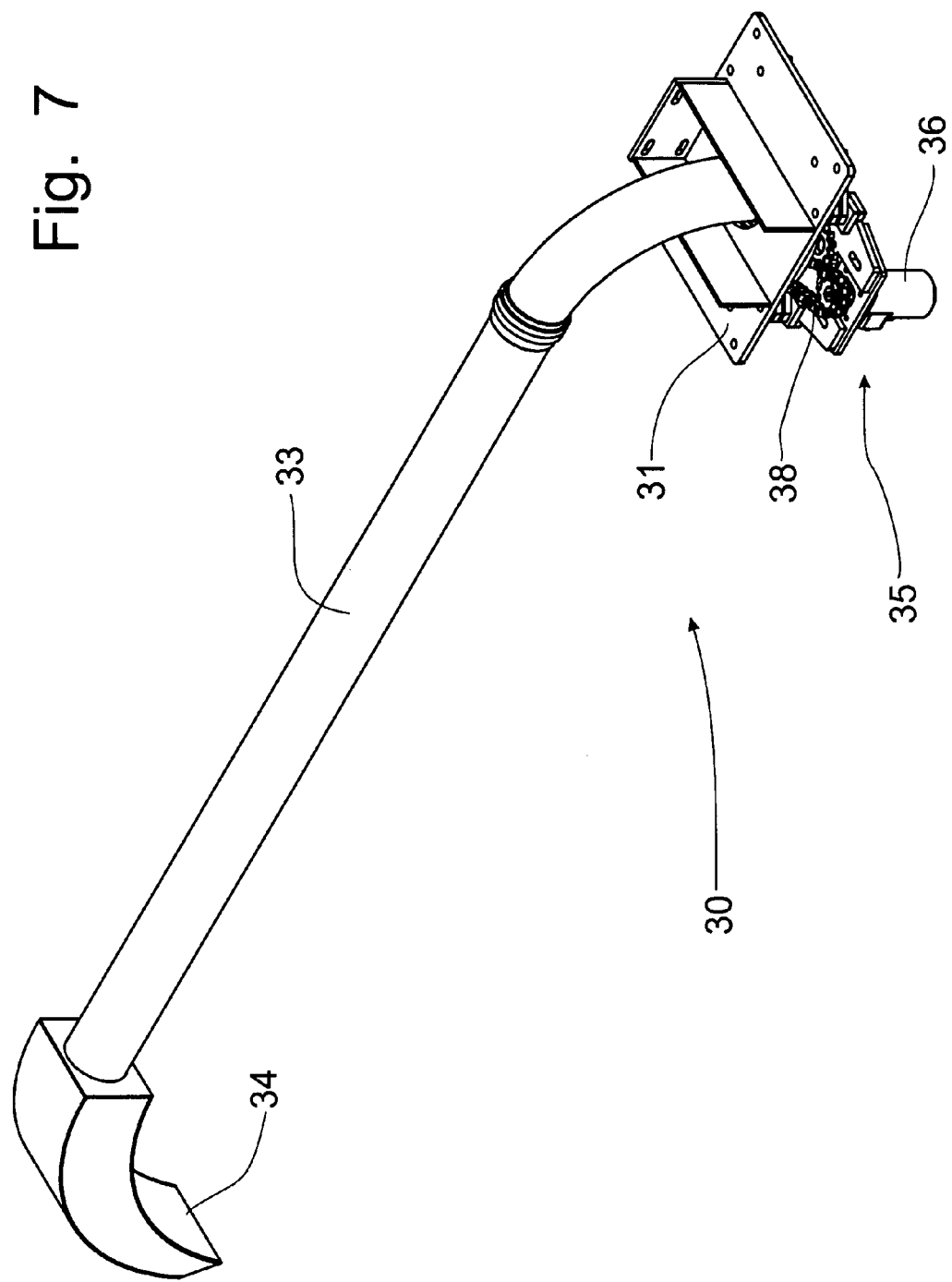
FIG. 7 is a perspective view of a boom attachment for mounting on the mobile apparatus to dispense the concrete mixture pumped thereto.
Figure 8:
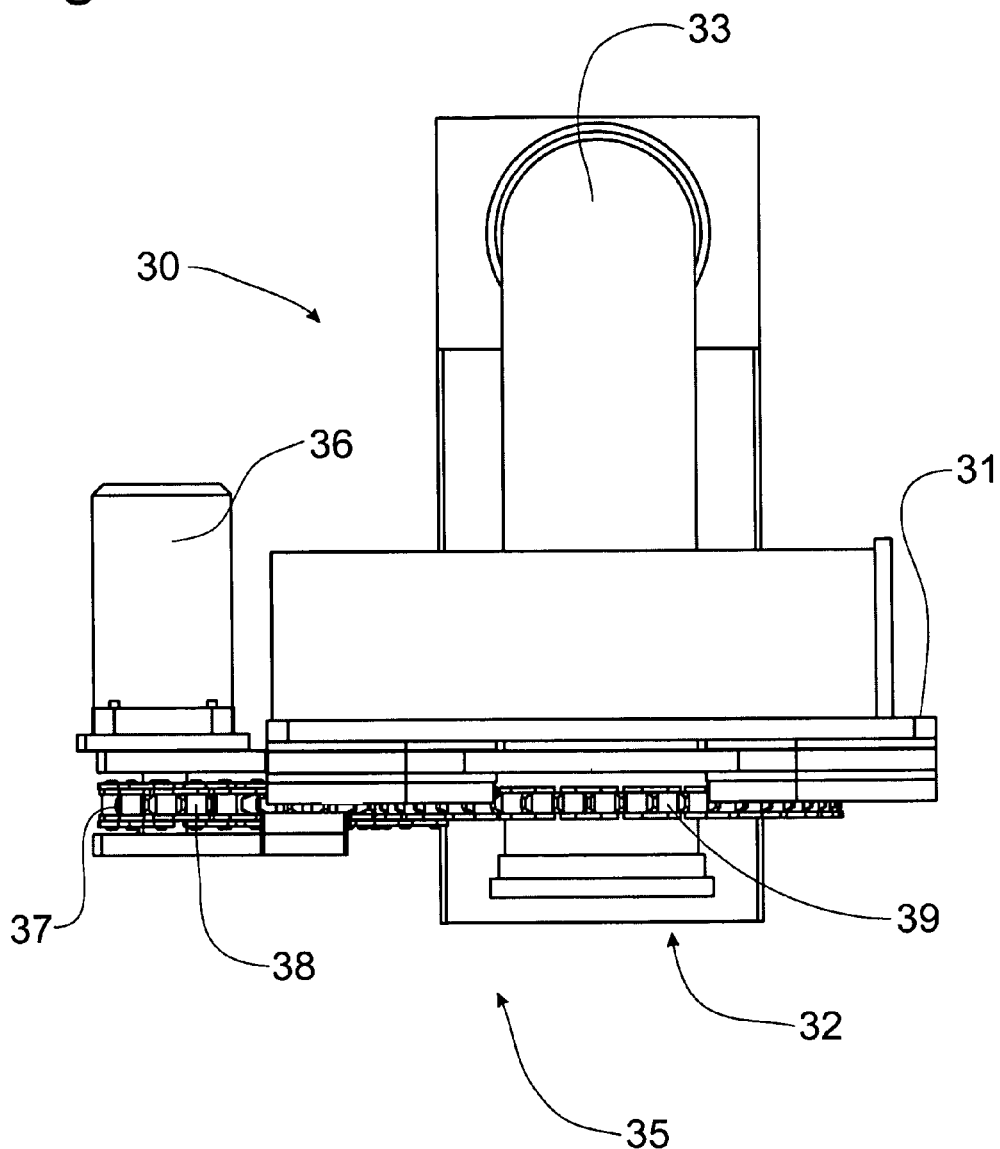
FIG. 8 is an enlarged elevational view of the boom attachment taken from behind the boom, showing an alternative arrangement for the location of the hydraulic motor driving the pivotal movement of the boom member.
Figure 9:
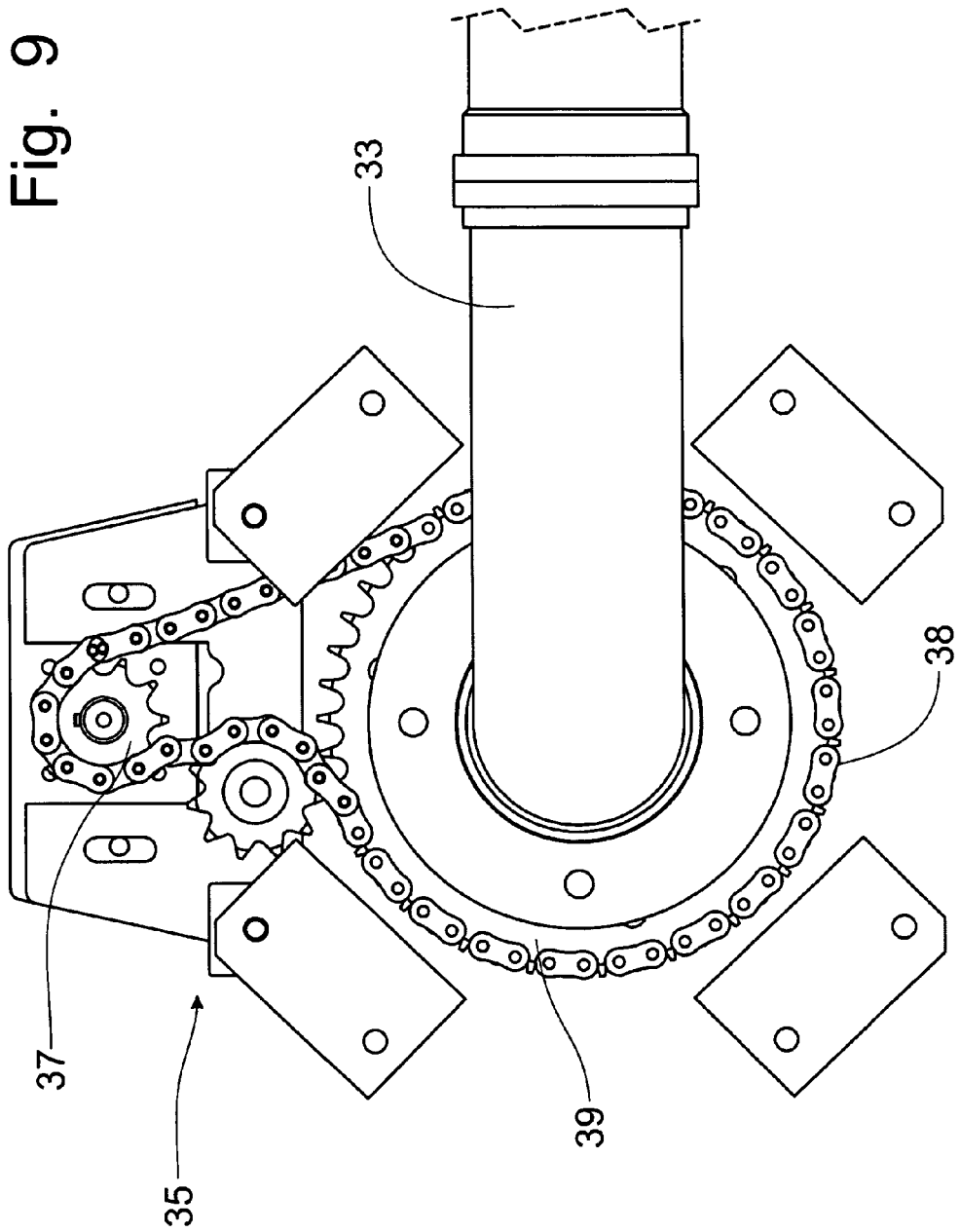
FIG. 9 is a partial detail plan view of the rotation drive mechanism for the boom apparatus, the boom being broken away for purposes of clarity.
Figure 10:
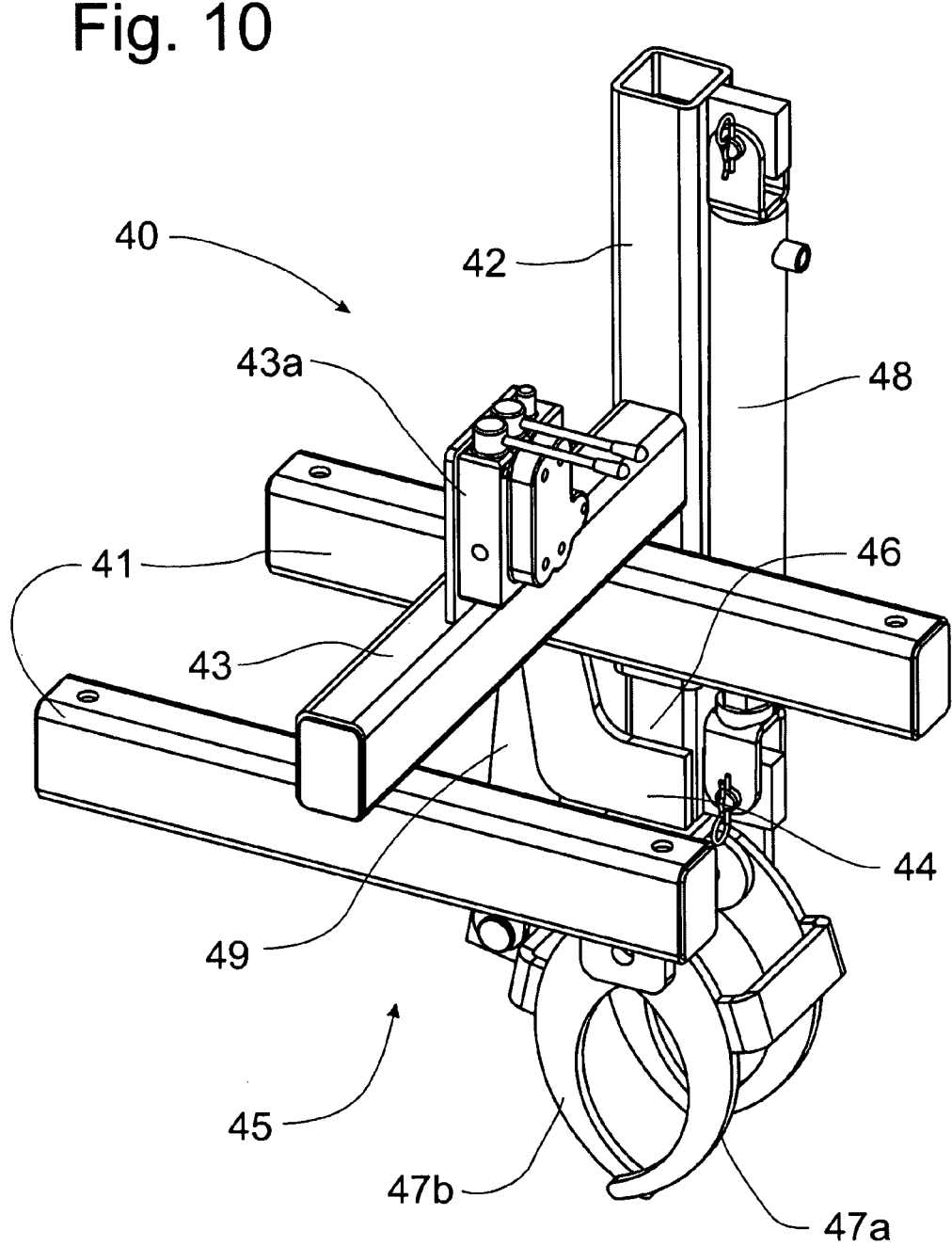
FIG. 10 is a perspective view of a grappling attachment for mounting on the mobile apparatus to lift and secure the concrete hose or pipe on the mobile apparatus, the grabber claws being in the raised and closed positions.

As is best seen in FIGS. 7-9, a boom attachment 30 is detachably connectable to the attachment mounts 14 on the mobile apparatus 10 to provide for the selective placement of concrete mixture. The boom attachment 30 includes a base plate 31 that is detachably connected to the attachment mounts 14 by fasteners to serve as a frame support for the boom attachment 30. A boom member 33, including a discharge spout 34 at the distal end thereof, is pivotally mounted on the base plate 31 for movement through 360 degrees to direct the placement of concrete mixture from the discharge spout 34 as desired. The boom member 33 is coupled to the concrete hose 5, best seen in FIGS. 19-23, through a coupler 32 supported by the base plate 31 that will permit the rotation of the boom member 33 while allowing the flow of concrete mixture from the concrete hose 5 into the boom member 33 for discharge therefrom.

The boom member 33 is also coupled to a drive mechanism 35 for powering the rotational movement of the boom member 33. The drive mechanism 35 includes a hydraulic motor 36 supported from the base plate 31 and an endless drive chain 38 entrained around the output sprocket 37 of the hydraulic motor 36 and the driven sprocket 39 affixed to the boom member 33 beneath the base plate 31. The hydraulic motor 36 is in flow communication with the hydraulic system 15 of the mobile apparatus 10 to receive a flow of hydraulic fluid under pressure to power the rotation of the hydraulic motor 36 in a conventional manner. The controls for the operation of the hydraulic motor 36 are preferably deployed on a hydraulic valve body supported on the boom attachment 30 for access by the operator; however, the controls can be operated through a wired or wireless remote control through the use of known technology. The hydraulic motor 36 can be driven in either direction to transfer rotational motion through the drive chain 38 to the driven sprocket 39 that rotates the boom member 33 to the desired position for discharge of the concrete mixture as desired. The orientation of the hydraulic motor 36 can be located below the sprocket 37 as is shown in FIGS. 7 and 9, or above the sprocket 37, as depicted in FIG. 8, depending on the spatial requirements of the frame 11 and other components of the mobile apparatus 10 when the boom mechanism 30 is mounted on the frame 11.

Referring now to FIGS. 10-13, the mobile apparatus 10 is also adapted to have mounted on the attachment mounts 14 a grappler attachment 40, which is formed with horizontal attachment frame members 41 that are sized and shaped to fit on the attachment mounts 14 so as to be selectively and detachably affixed to the mobile apparatus 10. The grappler attachment 40 also includes a generally vertical support frame member 42 and a horizontal transverse cross frame member 43 spanning between the two horizontal attachment frame members 41. The grabber member 45 is formed with an elongated shaft member 46 that is telescopically received within the vertical support frame member 42 so as to be extendable therefrom. The lowermost end of the elongated shaft 46 is connected to a fixed grabber claw assembly 47a and a pivoted grabber claw assembly 47b.

A hydraulic lift cylinder 48 is mounted to the vertical support frame member 42 and is connected via a mounting tab to the elongated shaft member 46 to cause the telescopic movement of the shaft member 46 relative to the vertical frame member 42. A second hydraulic pivot cylinder 49 is mounted on a pivot frame member 44 that is affixed to the vertical shaft member 46 so as to be vertically movable with the grabber member 45 as the elongated shaft 46 moves telescopically with respect to the vertical support member 42. The second hydraulic pivot cylinder 49 is connected by a mounting bracket to the pivoted grabber claws 47b so that the extension and contraction of the hydraulic pivot cylinder 49 affects a pivotal movement of the pivoted grabber claws 47b relative to the fixed grabber claws 47a, irrespective of the vertical position of the grabber member 45.

Figure 11:
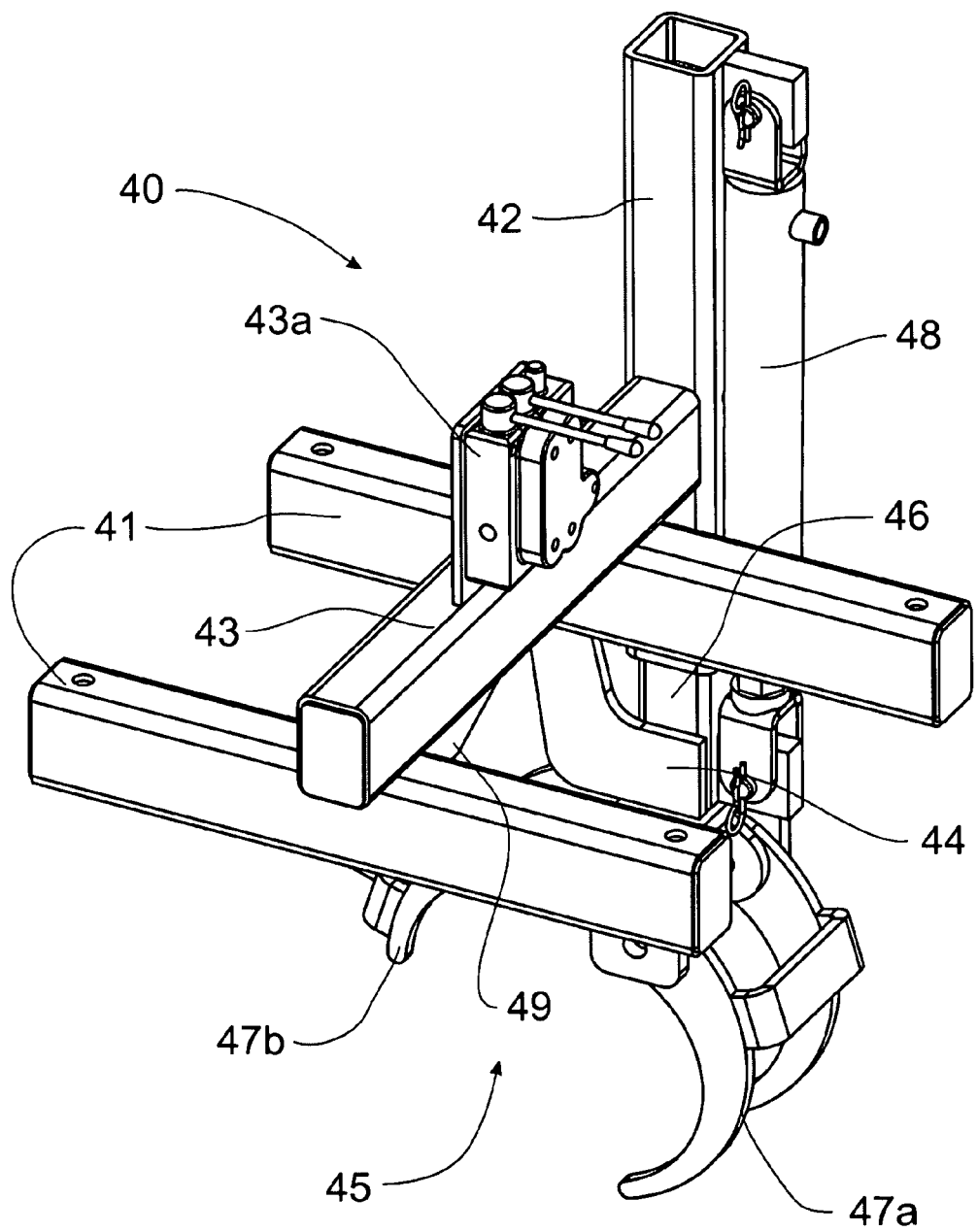
FIG. 11 is a perspective view of the grappling attachment similar to that of FIG. 10, but showing the grabber claws in the raised and opened positions.
Figure 15:
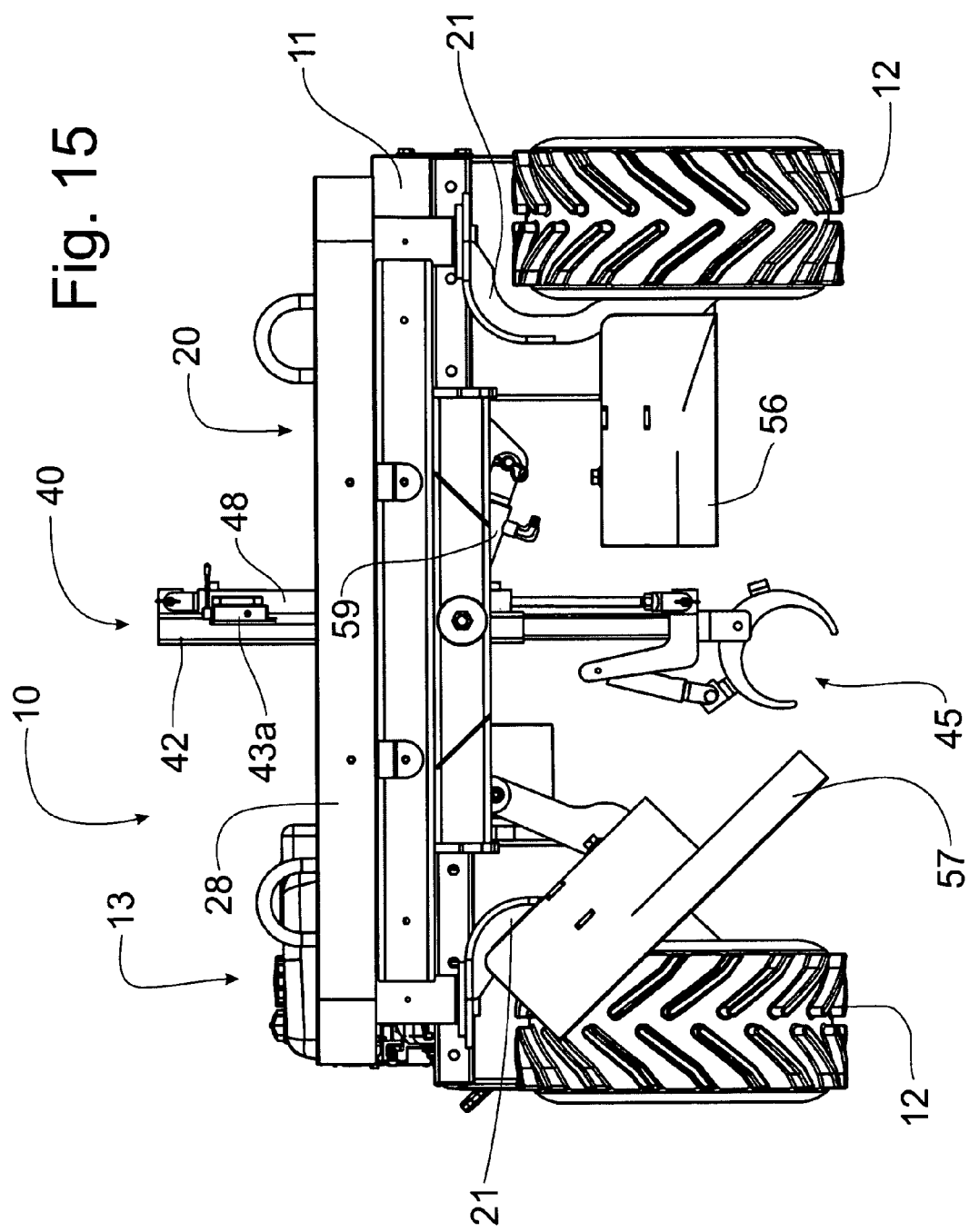
FIG. 15 is a rear elevational view of the mobile apparatus having the grappling attachment mounted thereon, the grabber claws being lowered and opened for engagement with a concrete pump hose or pipe being straddled by the mobile apparatus, the movable portion of the horn apparatus being pivoted to an open position to permit the elevation of the concrete pump hose by the grappling attachment.
Figure 16:
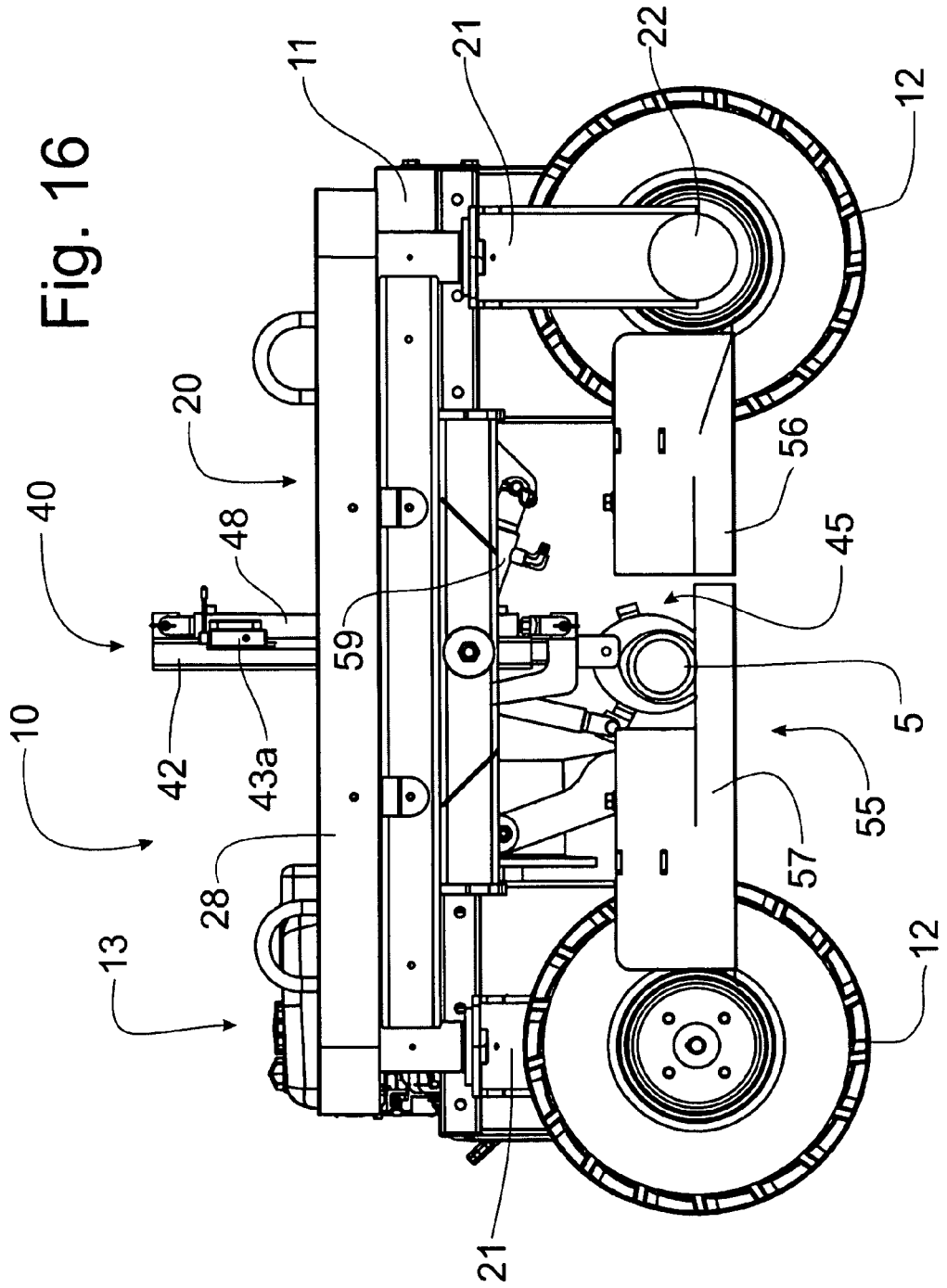
FIG. 16 is a rear elevational view of the mobile apparatus showing the grappling attachment having elevated a concrete pump hose which is supported on the horn apparatus, the wheels having been rotated to a transverse orientation for movement of the concrete hose sideways.

In operation, the mobile apparatus 10 is straddled over the concrete hose or pipe that is to be supported. The grabber member 45 is lowered to the position shown in FIGS. 13 and 15 and the grabber claws 47a, 47b are opened by pivoting the pivoted grabber claws 47b through operation of the hydraulic pivot cylinder 49, as is depicted in FIGS. 11 and 15. The grabber member 45 is lowered sufficiently that the grabber claws 47a, 47b are engagable with the concrete hose or pipe to be supported and the pivoted grabber claws 47b are moved to the closed position as depicted in FIG. 13 to grasp the concrete hose or pipe within the grabber member 45. The grabber member 45 can then be raised by contracting the hydraulic lift cylinder 48 to move the grabber member 45 into the raised position, as is shown in FIG. 16. The horn members 50, 55 can be closed underneath the concrete hose or pipe so that the concrete hose or pipe is supported by the grabber member 45 and the front and rear horn members 50, 55.

Figure 17:
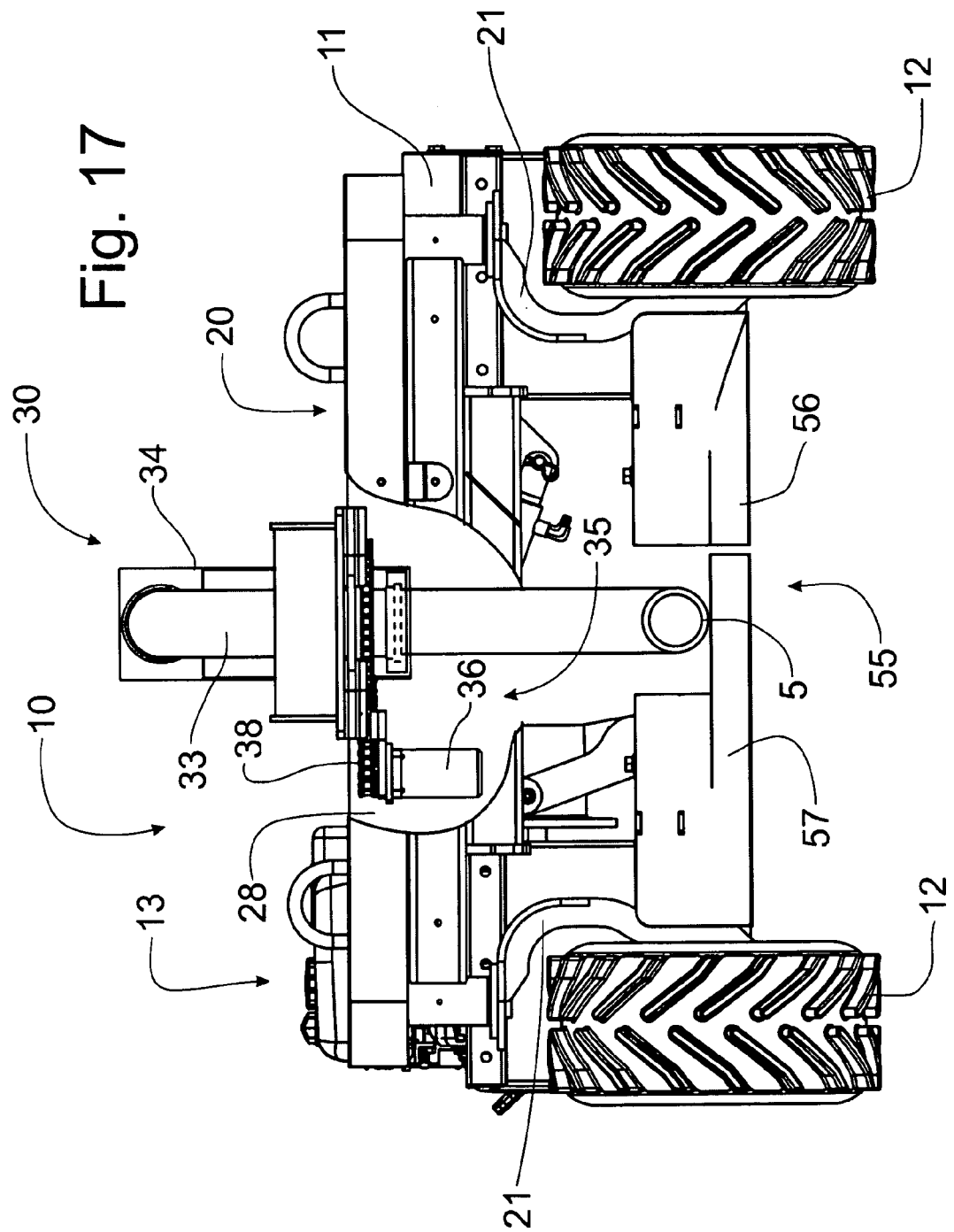
FIG. 17 is a rear elevational view of the mobile apparatus having a boom attachment mounted thereon, portions of the frame of the mobile apparatus being broken away to permit a better view of the boom attachment, the concrete pipe attached to the boom attachment being supported by the horn apparatus.
Figure 18:
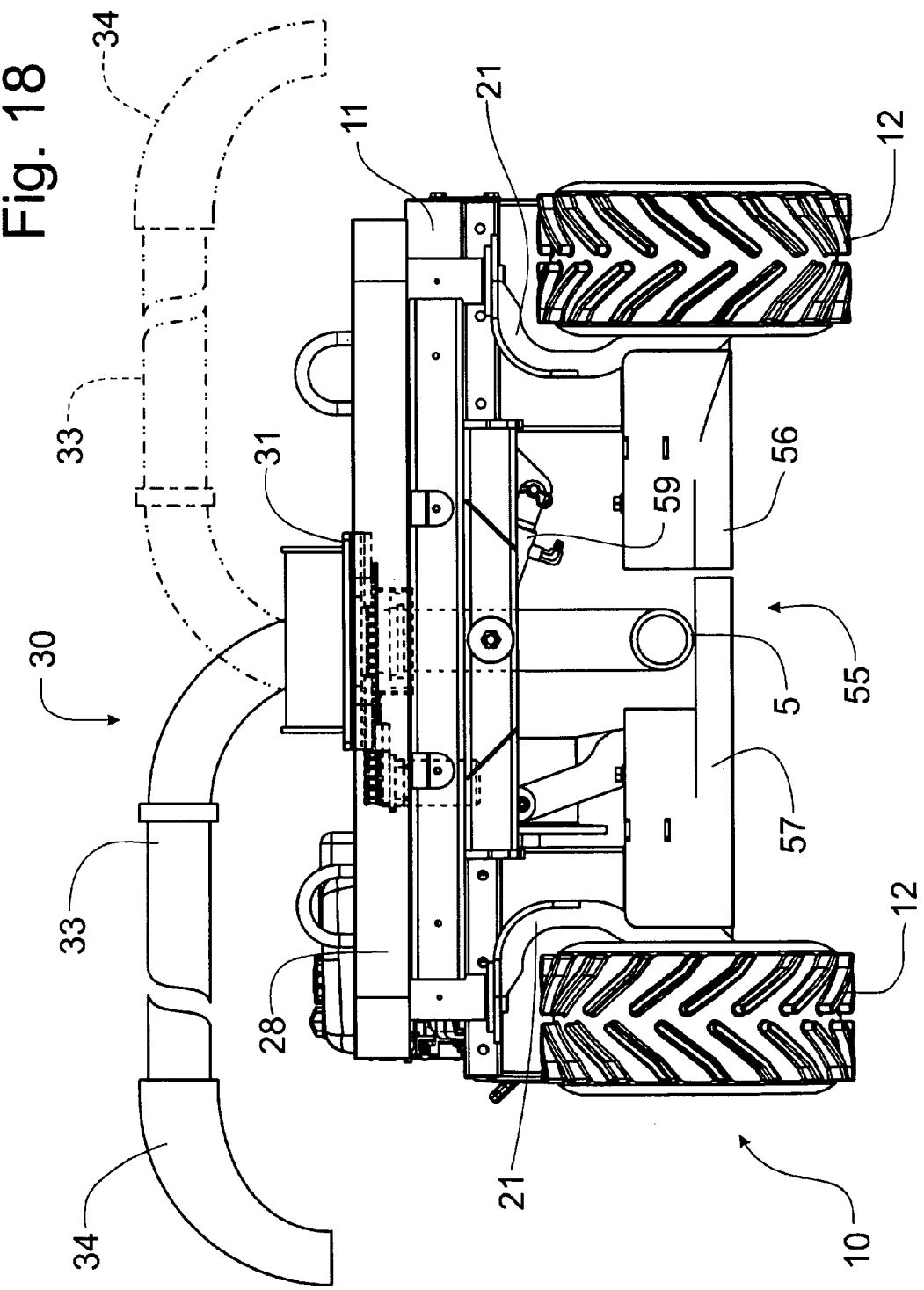
FIG. 18 is a rear elevational view of the mobile apparatus having a boom attachment mounted thereon, the movement of the boom being shown in phantom from one side orientation to another, portions of the central part of the boom being broken away for purposes of clarity.
Figure 19:
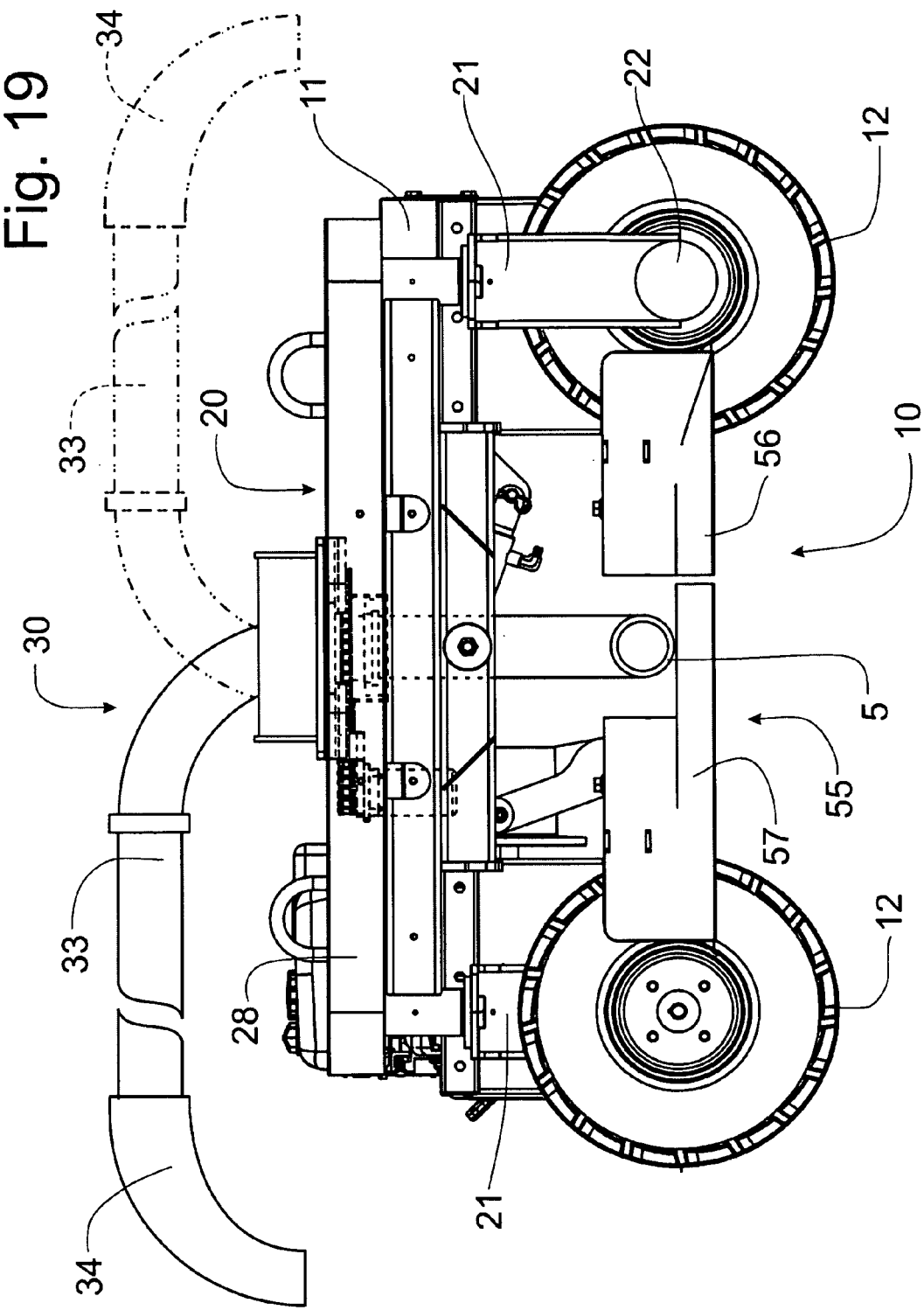
FIG. 19 is a rear elevational view of the mobile apparatus similar to that of FIG. 18, but showing the wheels being rotated into a transverse orientation for transverse movement of the mobile apparatus and the concrete pump hose being carried thereby.
Figure 20:
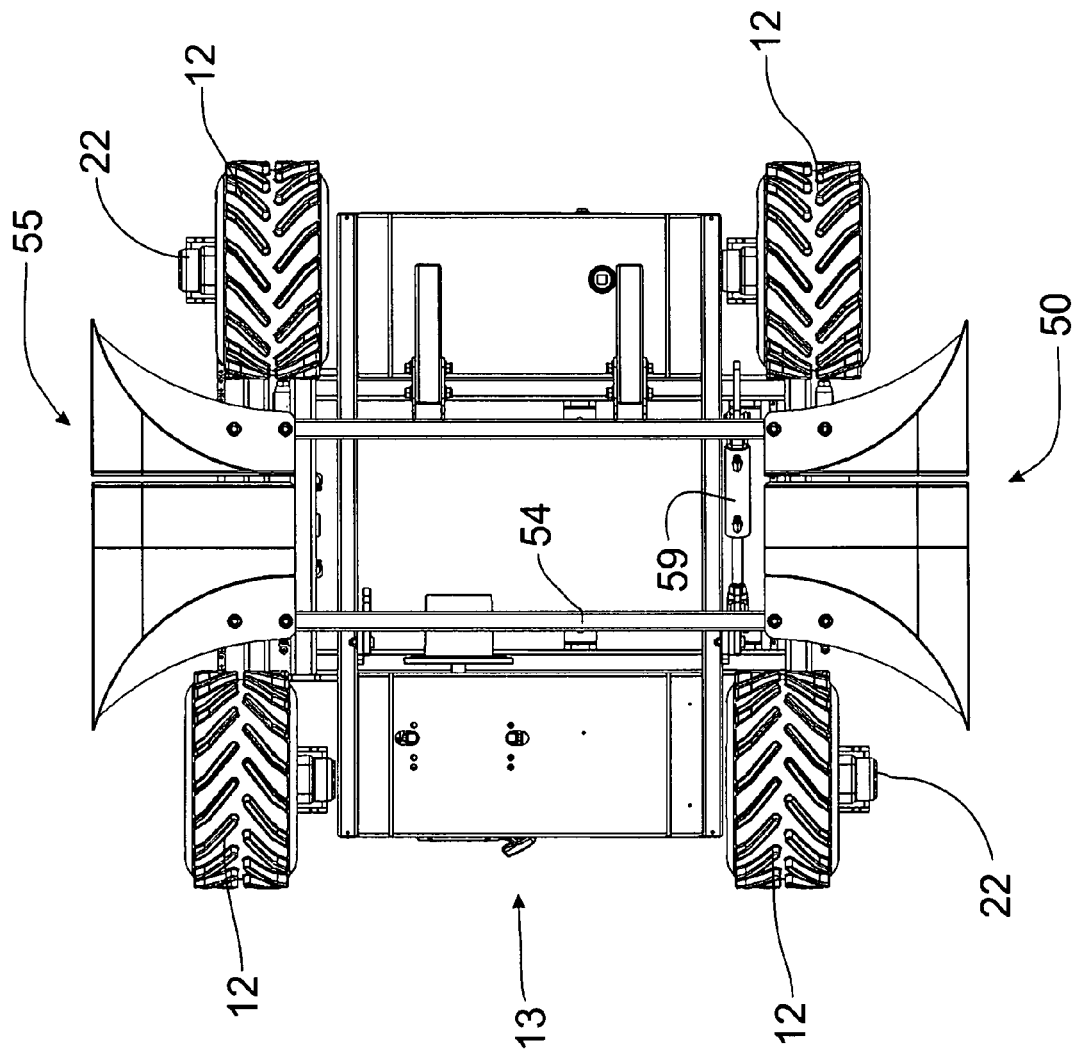
FIG. 20 is a top plan view of the mobile apparatus with the front and rear pairs of wheels being turned into the transverse orientation.
Figure 21:
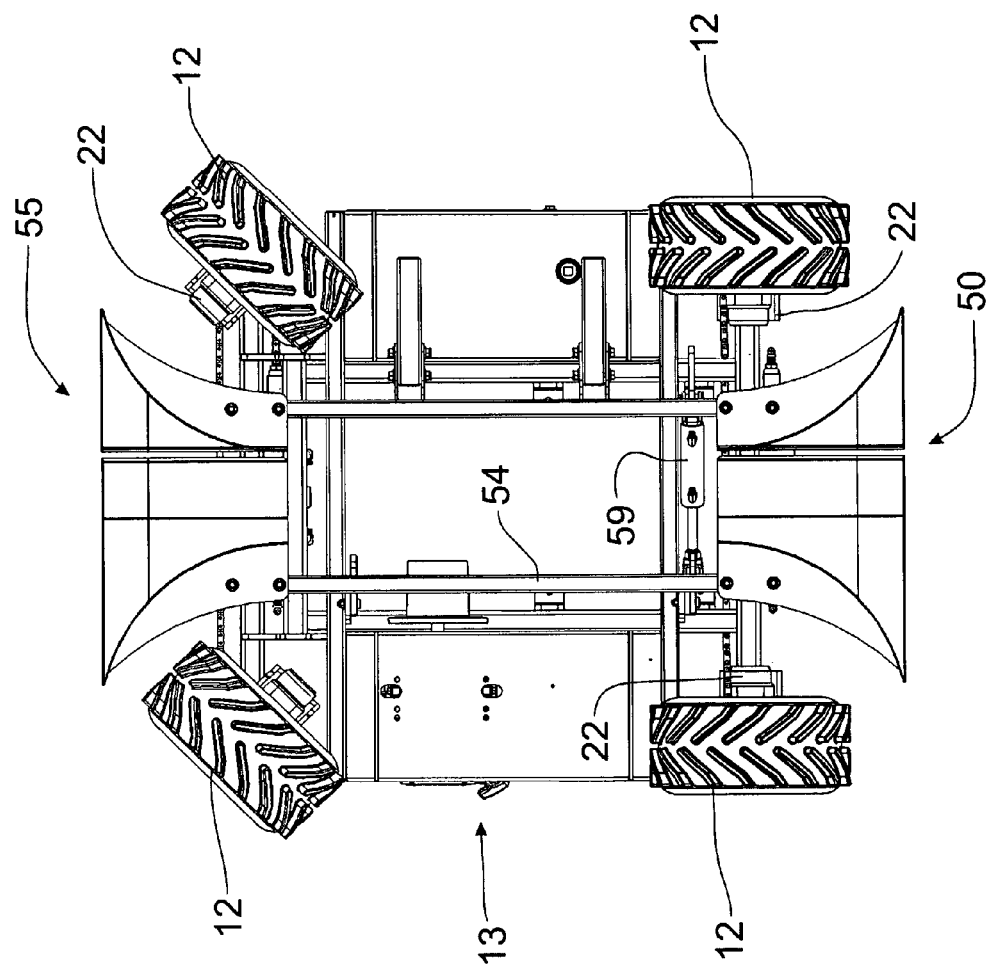
FIG. 21 is a top plan view of the mobile apparatus with the rear pair of wheels being oriented longitudinally and the front pair of wheels being turned in the same direction at an angle of approximately 45 degrees to provide a turn maneuver for the mobile apparatus.
Figure 22:
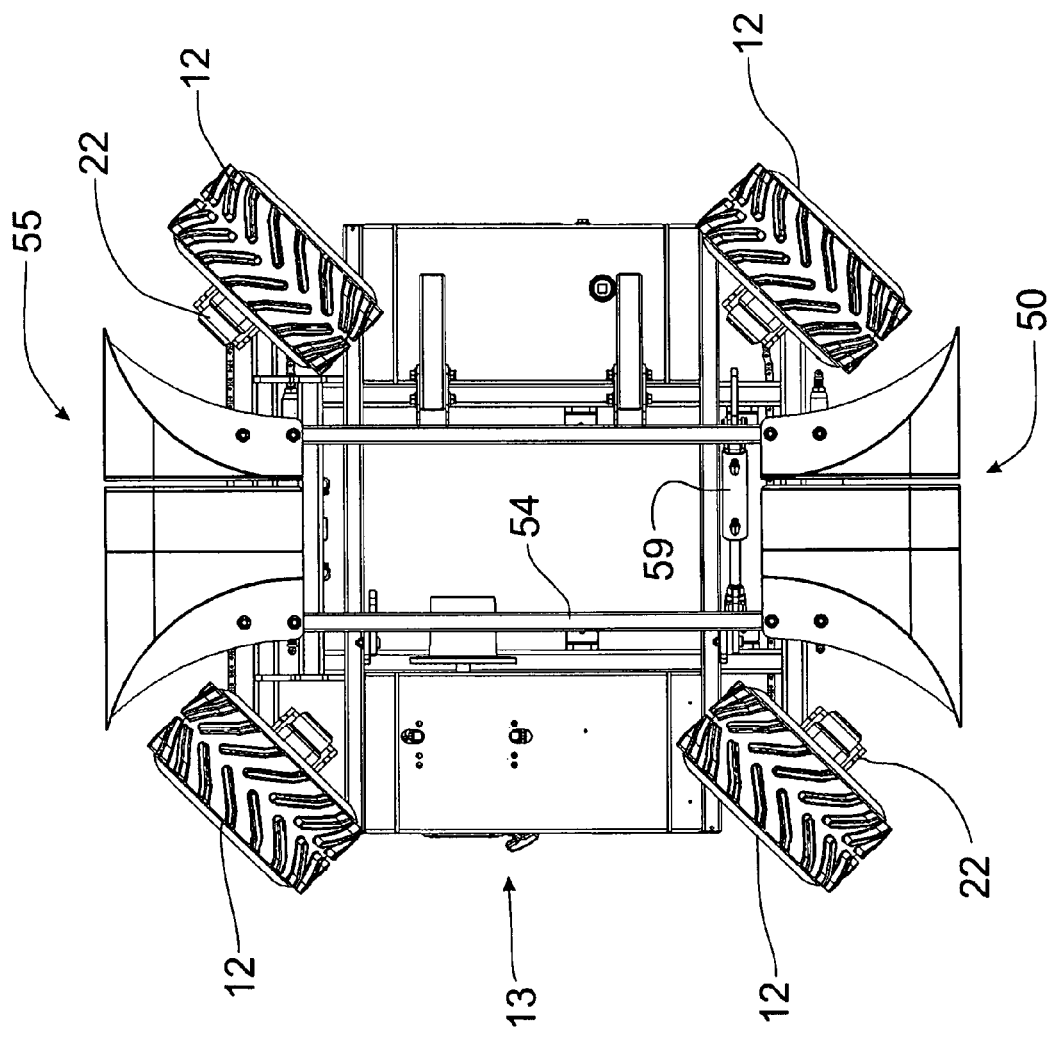
FIG. 22 is a top plan view of the mobile apparatus with the front and rear pairs of wheels turned 45 degrees in the same direction to affect a diagonal shifting movement of the mobile apparatus.
Figure 23:
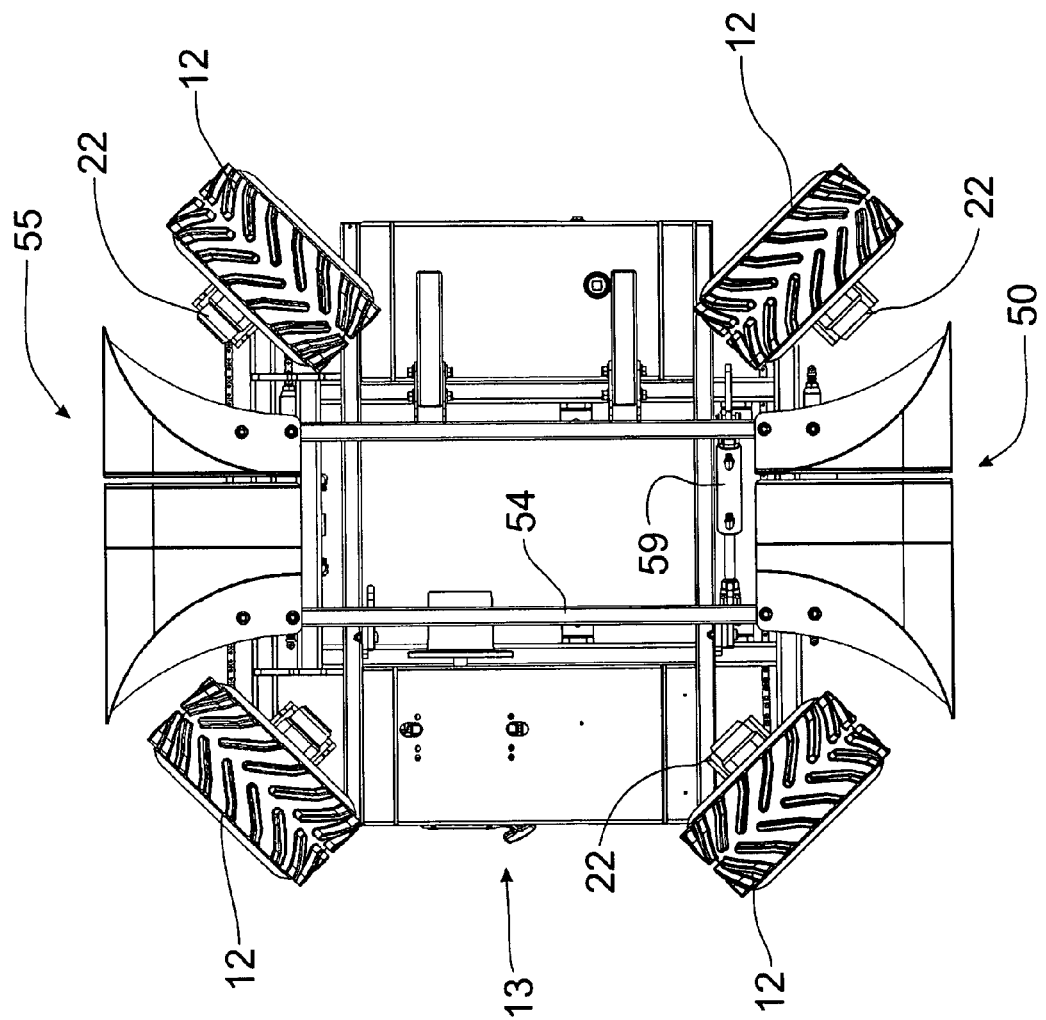
FIG. 23 is a top plan view of the mobile apparatus with the front and rear pairs of wheels being turned 45 degrees in opposite directions to enable the mobile apparatus to do a spin turn, such movement would not be possible while said horn apparatus is supporting a concrete pump hose or pipe.

As best seen in FIGS. 14-25, the mobile apparatus 10 is provided with front and rear horn members 50, 55 that help support the concrete hose or pipe 5. The use of the front and rear horn members 50, 55 is primarily in conjunction with the operation of the grappler attachment 40. However, as can be seen in FIGS. 17-19, the rear horn member 55 also supports the concrete hose 5 when connected to the coupler 32 of the boom attachment 30.

Figure 3:
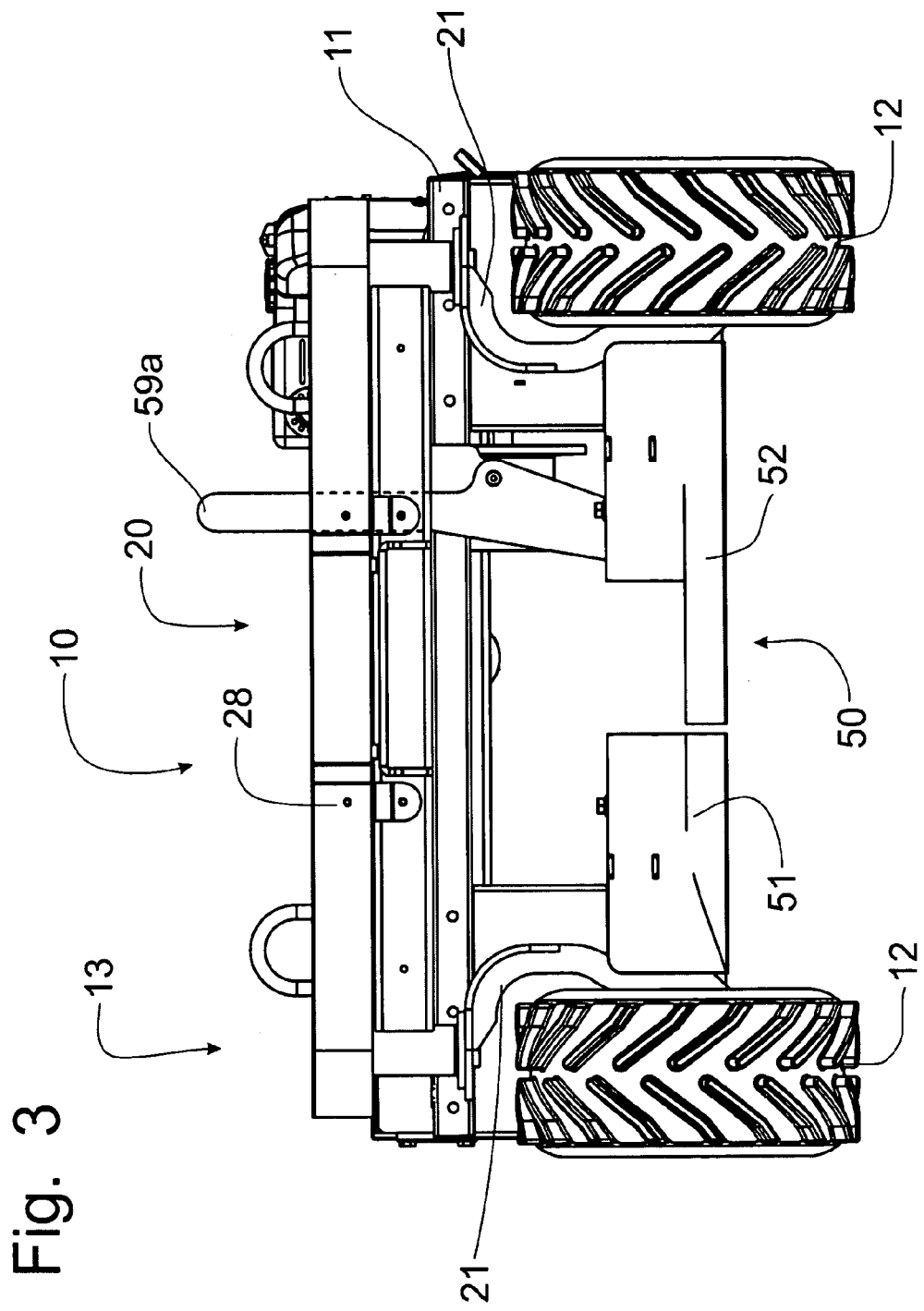
FIG. 3 is a front elevational view of the mobile apparatus shown in FIG. 1, an alternative embodiment of the pivot control mechanism for the horn members being shown.
Figure 4:
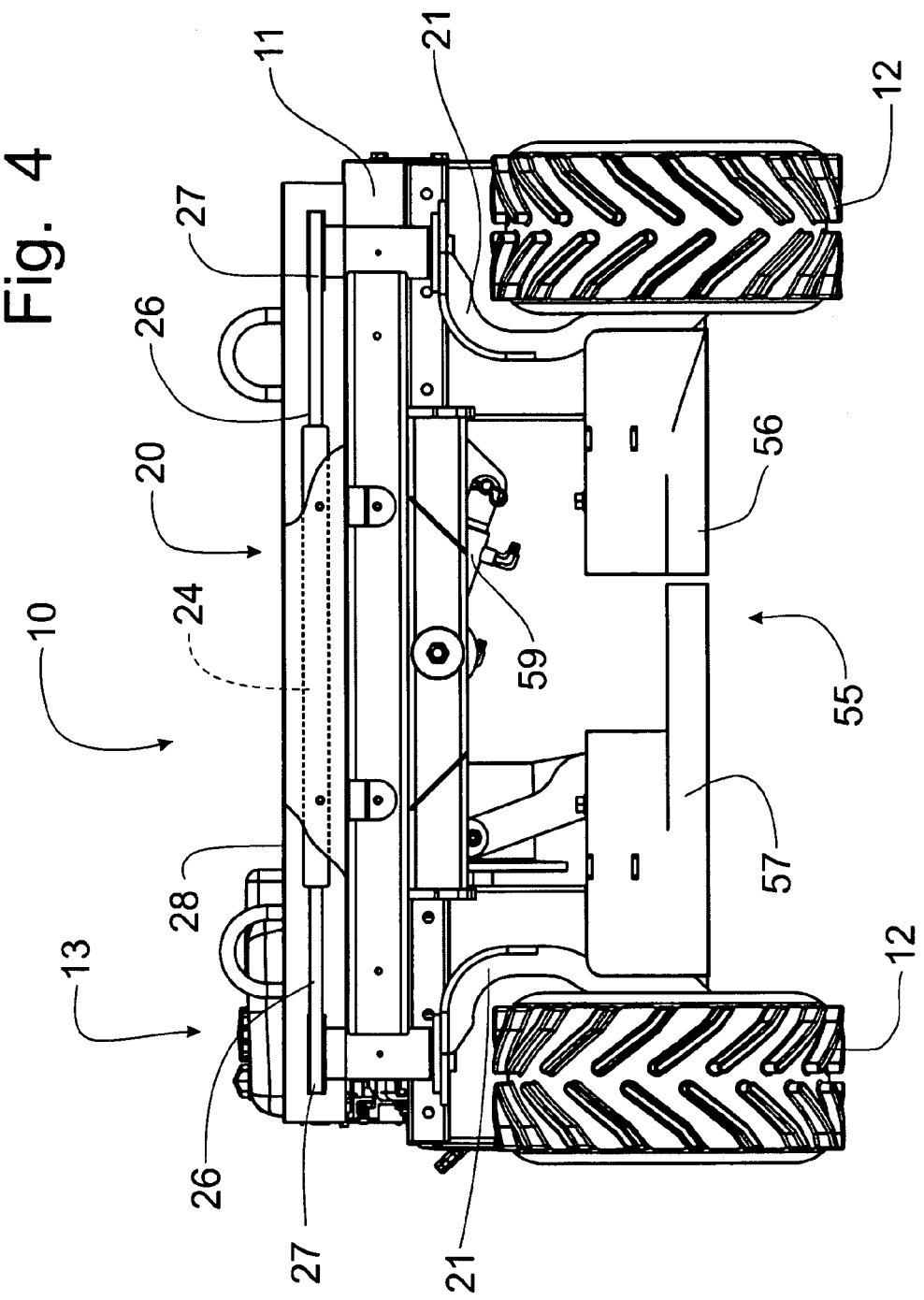
FIG. 4 is a rear elevational view of the mobile apparatus shown in FIG. 1, portions of the rear steering mechanism cover being broken away to better view the rear elevational view of the steering mechanism.
Figure 5:
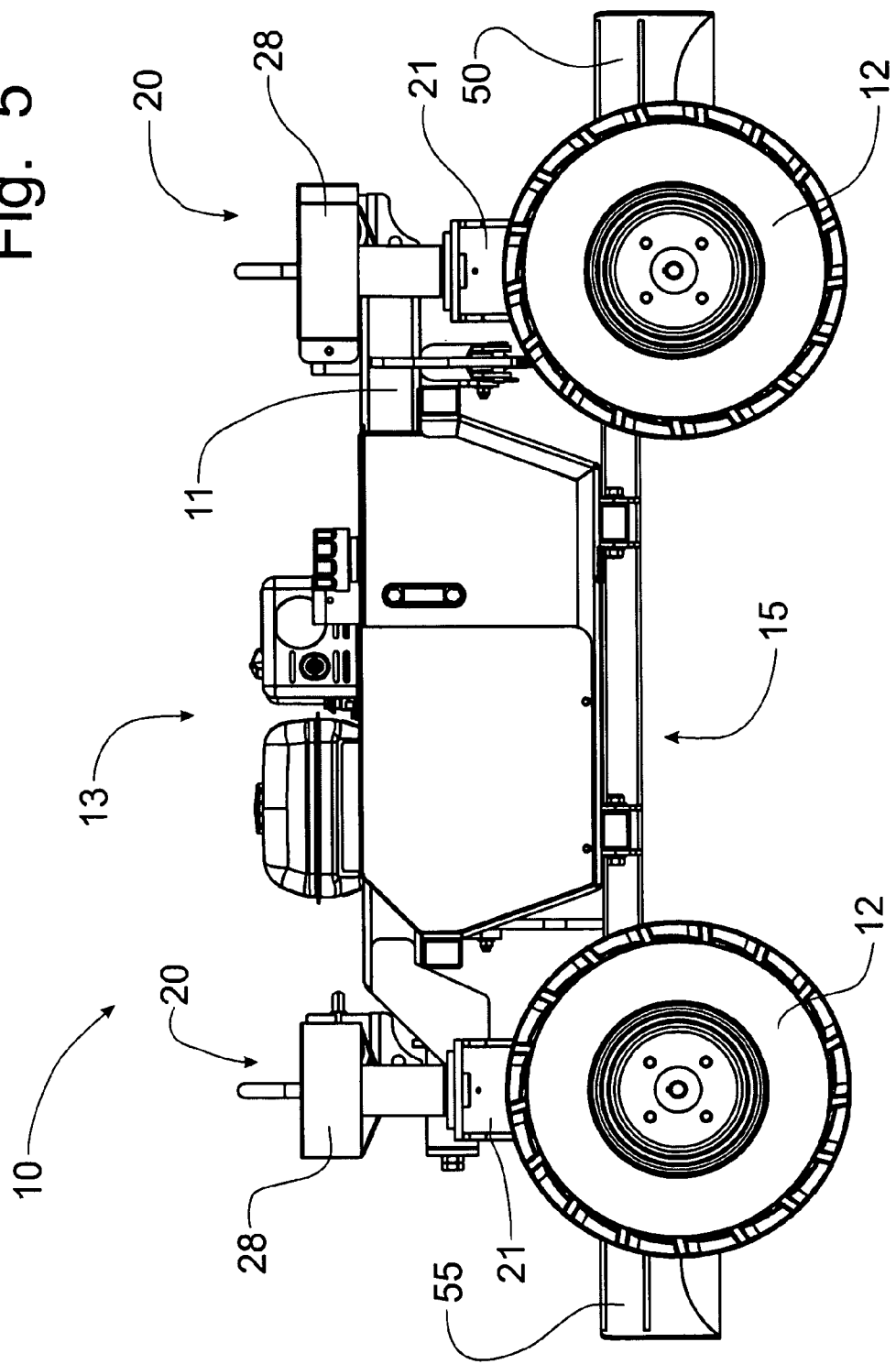
FIG. 5 is a right side elevational view of the mobile apparatus depicted in FIG. 1.
Figure 6:
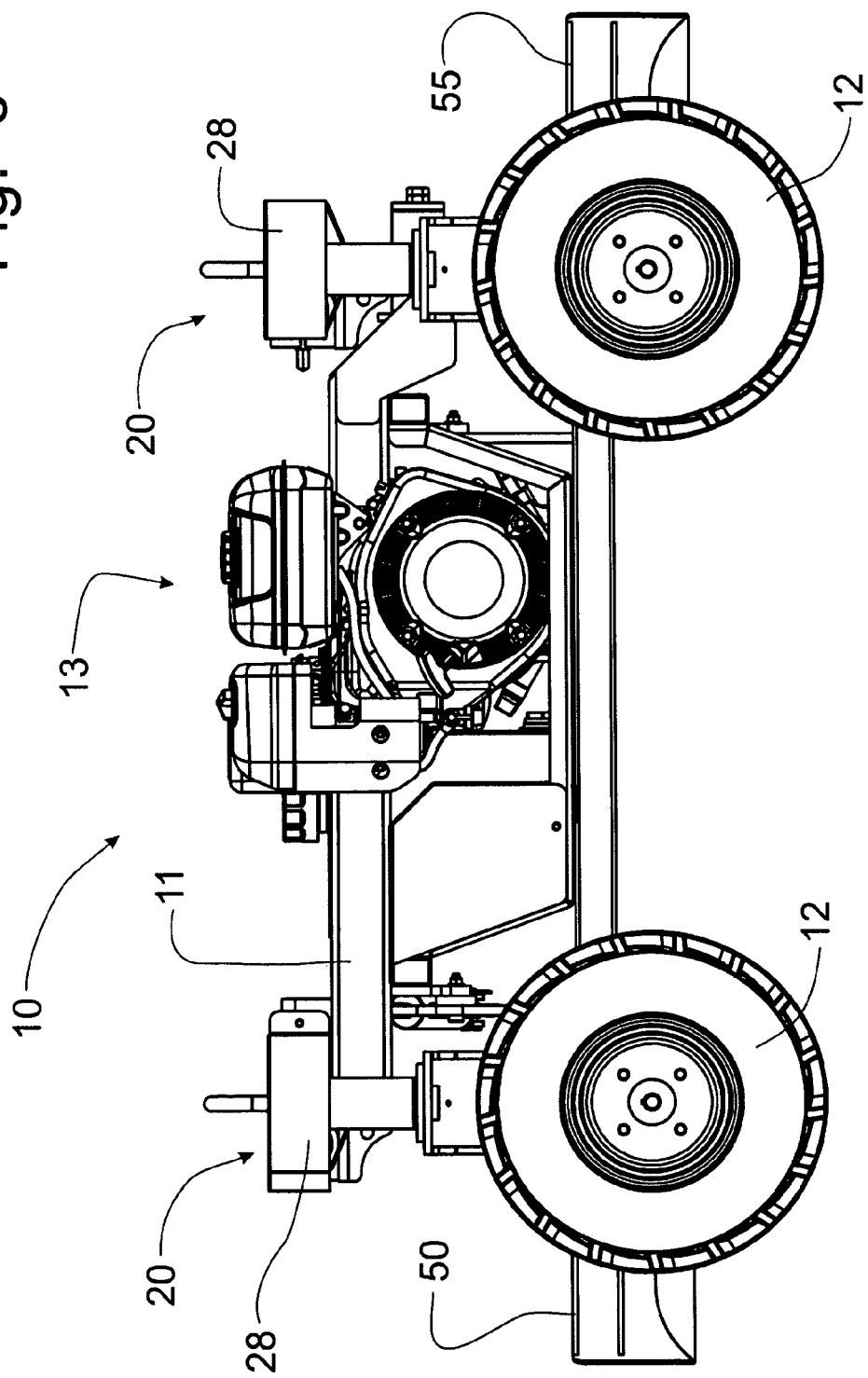
FIG. 6 is a left side elevational view of the mobile apparatus shown in FIG. 1.

Each horn member 50, 55 is formed in two sections, a smaller fixed section 51, 56 and a larger movable section 52, 57. The two movable sections 52, 57 can be independently mounted and controlled through separate hydraulic cylinders; however, the two movable sections are preferably joined together by a longitudinally extending connector member 54 that provides for simultaneous movement of the two movable sections 52, 57 through operation of a single hydraulic cylinder 59 that is conveniently mounted on the front end of the mobile apparatus 10. Alternatively, as is depicted in FIG. 3, the movable section 52, 57 of the horn members 50, 55 can be pivotally moved to open a gap in the horn members 50, 55 for the passage of the concrete pump hose through manual manipulation of a handle 59a that is connected to the movable sections 52, 57 to force pivotal movement thereof. A mechanical latch, not shown, would secure the handle 59a to the frame 11 when the horn members 50, 55 are closed and particularly when the concrete pump hose is supported thereon.

In operation, the hydraulic cylinder 59 is extended to open the front and rear horn members 50, 55 when the grappler attachment 40 is lowered and the grabber claws 47b opened to engage a concrete hose or pipe 5 that the mobile apparatus 10 is straddling. Once the grappler attachment 40 has secured and raised the concrete hose or pipe 5, which has some limited flexibility, the concrete hose or pipe 5 will be elevated also in the vicinity of the front and rear horn members 50, 55. The hydraulic cylinder 59 can then be retracted to pivotally move the movable sections 52, 57 back to the closed position to lift under the partially elevated concrete hose or pipe 5 and provide support thereto. As represented in FIG. 16, the concrete hose or pipe 5 is supported by the mobile apparatus 10 from the front horn member 50, through the grappler attachment 40 and to the rear horn member 55.

Each horn member 50, 55 is formed with a curved shaped, as can be seen in FIG. 1 for example, that flares outwardly away from the inward portion of the respective horn member 50, 55. Accordingly, each of the fixed and movable sections 51, 52, 56, 57 of the horn members 50, 55 are formed with a curved vertical flange 53, 58 that limits the lateral movement of the concrete hose or pipe 5 relative to the respective horn member 50, 55. The operation of the mobile apparatus 10 when equipped with a grappler attachment 40 is to support a substantial portion of the concrete hose or pipe 5 so as to be able to move the concrete hose or pipe 5 over the subgrade surface of the floor on which the concrete mixture is being deposited to facilitate the movement of a second mobile apparatus 10 equipped with a boom attachment 30 to dispense the concrete mixture throughout the floor structure. Accordingly, the lateral movement of the concrete hose or pipe 5 induced by the first mobile apparatus 10 equipped with a grappler attachment 40 will result in a lateral shifting of the concrete hose or pipe 5, due to the friction of the concrete hose or pipe 5 on the subgrade in front or and/or behind the mobile apparatus 10 with the grappler attachment 40 supporting the concrete hose or pipe 5. The curved flanges 53, 58 will limit the lateral movement of the concrete hose 5 relative to the horn members 50, 55 as the mobile apparatus 10 moves laterally.

The operation of the mobile apparatus 10 is best seen in FIGS. 14-23. In FIGS. 14-16, a mobile apparatus 10 equipped with a grappler attachment 40 is depicted; while in FIGS. 17-19, a mobile apparatus 10 equipped with a boom attachment 30 is shown. Preferably, two of the mobile apparatus are utilized in a concrete pour for a floor, such as a basement floor, of a building where conventional concrete pump trucks and boom trucks cannot adequately access. The mobile apparatus 10 with the boom attachment 30 is positioned at the end of the concrete hose 5 such that the concrete hose 5 is connected to the boom apparatus 30 to supply concrete mixture thereto. This mobile apparatus 10 with the boom attachment 30 can move fore-and-aft, laterally, diagonally, or in a turning motion, as described above, to position the discharge spout 34 of the boom member 33 at the necessary positions to dispense the concrete mixture onto the floor subgrade.

For large floor structures where a substantial amount of concrete hose 5 is utilized to reach the most remote areas of the floor structure, a second mobile apparatus 10 equipped with a grappler attachment 40 is provided to help in the movement of the concrete hose 5 over the floor subgrade. In such situations, the second mobile apparatus 10 is straddled over the concrete hose 5 at a distance from the first mobile apparatus 10 to position the grabber claws 47a, b over the concrete hose 5. The concrete hose 5 is engaged and raised onto the horn members 50, 55 in the manner described above by lowering the grabber member 45 with opened claws 47b, grasping the concrete hose 5 by closing the pivoted claws 47b and then raising the grabber member 45 by the hydraulic cylinder 48. The previously opened horn members 50, 55 can then be closed to position the concrete hose 5 on top of the horn members 50, 55 for support thereof.

Once supported on the horn members 50, 55 and the grabber member 45, the concrete hose 5 can be moved fore-and aft, laterally, diagonally or through a turning motion in conjunction with the first mobile apparatus 10, as reflected in FIGS. 20-23, to position the concrete hose 5 as needed for the first mobile apparatus 10 equipped with the boom attachment 30 to reach the most remote areas of the floor structure. Although the boom attachment 30 and the grappler attachment 40 are detachment from the mobile apparatus 10 and are interchangeable, typically these attachments 30, 40 are not switched and remain on the mobile apparatus 10 on which they were originally mounted.

Control of the mobile apparatus 10 and the attachment 30, 40 mounted thereon can be accomplished in a number of ways. The preferred manner of control is via a remote control 60, which can be either hard wired or wireless. The remote control (not shown) is operatively connected to the valve block 17 to control the valve spools therein to direct the flow of hydraulic fluid to the respective hydraulic cylinders and motors as needed. In the embodiment reflected in FIGS. 14-17, the remote control would preferably have toggle switches (not shown) for controlling the operation of the front and rear steering cylinders 23, the hydraulic motors 22 on the respective wheels 12 and the hydraulic cylinder 59 for controlling the movable sections 52, 57 of the front and rear horn members 50, 55.

Accordingly, this embodiment of the remote control (not shown) controls the operative functions of the mobile apparatus 10, but not the operation of the attachments 30, 40. One skilled in the art will recognize that the attachments 30, 40 could also be controlled through a remote control, wither hard wired or wireless. As can be seen in FIGS. 14-16, the valve block 43a mounted on the cross frame member 43 is provided with conventional control levers that operate the hydraulic functions of the grappler attachment 40, as these hydraulic functions are not used frequently. Similarly, a valve block (not shown) can be utilized to control the rotational movement of the boom member 33 and would be provided with a manually operated control lever.

Once the concrete mixture is deposited in sufficient quantity on the subfloor by the boom attachment 30, other concrete finishing machines, such as a screed and a rotary finishing machine, are utilized in a conventional manner to finish the surface of the concrete floor. The finishing of the concrete floor will occur as the boom attachment 30 continues to deposit concrete mixture on the subfloor, as the first mobile apparatus 10 having the boom attachment 30 mounted thereon can be positioned to add concrete mixture to that already deposited in the event an inadequate supply has been dispensed. As the concrete floor gets finished and the concrete mixture is deposited on the subfloor, the first mobile apparatus 10 having the boom attachment 30 mounted thereon retreats progressively toward the second mobile apparatus equipped with the grappler attachment 40.

The second mobile apparatus 10 having the concrete hose 5 supported thereon by the grappler attachment 40 and the front and rear horn members 50, 55 will also retreat to try to maintain a reasonably constant spacing from the first mobile apparatus 10 and to drag the concrete hose 5 rearwardly toward the concrete pump truck. If needed, the second mobile apparatus having the grappler attachment 40 mounted thereon can release the concrete hose 5 and re-grasp and support the concrete hose 5 at a more suitable location simply by reversing the grasping procedure to lower the concrete hose 5 from the opened front and rear horn members 50, 55 and to open the pivoted claws 47b to release engagement of the concrete hose 5, then repositioning over the concrete hose 5 to the desired location and re-grasping the concrete hose 5.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention.

Having thus described the invention, what is claimed is:

1. A mobile apparatus for supporting a concrete hose from a concrete pump comprising:

a frame supported for movement over a surface by a front pair of wheels and a rear pair of wheels;

a steering mechanism associated with each said front and rear pairs of wheels, each wheel being pivotally supported for movement about a generally vertical axis, said steering mechanism being operable to pivot each said wheel in said pair of wheels about the corresponding said generally vertical axis through an arcuate angle of at least 90 degrees so that each said wheel is positionable in a longitudinally extending orientation and in a transversely extending orientation, said front pair of wheels being pivotally positionable independently of said rear pair of wheels; and an attachment apparatus for selectively supporting said concrete hose, said attachment apparatus including a front horn member and a rear horn member positionable to support said concrete hose when placed into engagement therewith.

2. The mobile apparatus of claim 1 wherein said steering mechanism is operable to rotate said wheels through an angular rotation of at least 135 degrees.

3. The mobile apparatus of claim 1 wherein each of said front and rear horn members are formed with a fixed portion and a movable portion, said movable portion being movable away from said fixed portion to allow said concrete pipe to be elevated above said horn member.

4. The mobile apparatus of claim 3 wherein said movable portions are pivotally supported on said frame for movement between a raised support position and an opened loading position, said movable portions of said front and rear horn members being connected together to permit simultaneous movement thereof.

5. The mobile apparatus of claim 3 wherein said frame supports a boom apparatus including a generally horizontally extending boom conduit to dispense concrete at a location remote from said mobile apparatus.

6. The mobile apparatus of claim 3 each said fixed portion and each said movable portion including an outwardly curved flange portion to limit any lateral movement of said concrete pump hose.

7. The mobile apparatus of claim 6 wherein said frame supports a grappling apparatus operable to grasp said concrete hose and raise said concrete hose into an elevated position for support on said front and rear horn members, said grappling apparatus including grabber claws movable between an open position and a closed position to encircle said concrete hose, said grappling apparatus also being mounted on said frame for vertical movement to raise and lower said grabber claws.

8. A mobile apparatus for supporting a concrete pump hose comprising:
a frame adapted for movement over a base surface and including a front pair of ground engaging members and a rear pair of ground engaging members supporting said frame for movement over the base surface, said frame being elevated above said base surface by said ground engaging members; and
a front horn member and a rear horn member mounted on said frame to support said concrete pump hose beneath said frame between said ground engaging members; and
a grappling apparatus mounted on said frame in a central position between said front and rear horn members to secure and elevate said concrete pump hose from said base surface onto said front and rear horn members.

9. The mobile apparatus of claim 8 wherein said frame mounts a boom apparatus connected in flow communication by a conduit with said concrete pump hose to deposit concrete at a location remote from said frame, said boom apparatus including a boom member pivotally movable about a generally vertical pivot axis aligned with said conduit to allow a flow of concrete from said concrete pump hose beneath said frame to said boom member extending above said frame.

10. The mobile apparatus of claim 8 wherein each said front and rear horn member has a fixed portion and a movable portion movable away from said fixed portion to permit the elevation of said concrete pump hose above said horn members, each said fixed portion and each said movable portion including an outwardly curved flange portion to limit any lateral movement of said concrete pump hose.

11. The mobile apparatus of claim 10 wherein said movable portions of each said front and rear horn members are connected together and pivotally movable simultaneously.

12. The mobile apparatus of claim 8 wherein said ground engaging members are wheels mounted for rotation about a generally horizontally oriented axis of rotation to provide movement of said frame, each said wheel also being mounted for pivotal movement about a generally vertically oriented axis to permit said wheels to pivot between a longitudinally extending orientation and a transversely extending orientation.

13. The mobile apparatus of claim 12 wherein said front and rear pairs of wheels are operably connected to a steering mechanism to control the pivotal movement of the corresponding pairs of said wheels, each said steering mechanism including an endless chain coupled to a double acting hydraulic cylinder to affect opposing movements of said chain being entrained around sprockets affixed to said wheels on said pivot axes.

14. The mobile apparatus of claim 13 wherein each said wheel is rotatably driven by a hydraulic motor operably connected to a hydraulic system supported on said frame and powered by an engine mounted on said frame.

15. In a mobile apparatus for supporting a concrete pump hose having a frame adapted for movement over a base surface by a front pair of wheels and a rear pair of wheels, said frame being steerable over said base surface to position said concrete pump hose as desired, the improvement comprising:
a rear horn member located between said rear pair of wheels, said rear horn member being operable to support said concrete pump hose in an elevated position above said base surface and below said frame so as to carry said concrete pump hose beneath said frame between the respective wheels of at least one of said pairs of wheels, said rear horn member including a fixed portion and a movable portion operable to move away from said fixed portion to permit an elevation of said concrete pump hose above said horn member so as to be supported thereon; and
a boom apparatus supported on said frame and including a boom member extending above said frame and being pivotally movable about a generally vertical pivot axis to direct concrete therethrough to a location remote from said frame, said boom apparatus further including a conduit having a vertical portion aligned with said vertical pivot axis to allow a flow of concrete from said concrete pump hose beneath said frame to said boom member extending above said frame.

16. The mobile apparatus of claim 15 wherein said boom member is operably connected to a drive mechanism for selectively powering the rotation of said boom member about said vertical pivot axis.

17. The mobile apparatus of claim 16 wherein said frame supports a horn member located between the wheels of said rear pair of wheels, said horn member being operable to support said concrete pump hose in an elevated position above said base surface and below said frame.

18. The mobile apparatus of claim 15 wherein said frame supports a front horn member located between said front pair of wheels, said front and rear horn members being operable to support said concrete pump hose in an elevated position above said base surface and below said frame.

19. The mobile apparatus of claim 18 wherein said rear horn member includes a fixed portion and a movable portion operable to move away from said fixed portion to permit an elevation of said concrete pump hose above said rear horn member so as to be supported thereon, the movable portions of said front and rear horn members being connected to permit simultaneous movement thereof.

20. The mobile apparatus of claim 19 wherein said frame supports a grappling apparatus intermediate said front and rear horn members, said grappling apparatus being operable to engage said concrete pump hose for elevation thereof above said horn members.

21. The mobile apparatus of claim 20 wherein each said wheel is supported for pivotal movement about a generally vertical pivot axis, each of said front and rear pairs of wheels being coupled to a steering mechanism to control the pivotal movement of the respective pair of wheels between a longitudinally extending orientation for movement of said frame longitudinally and a transversely extending orientation for movement of said frame transversely.

22. The mobile apparatus of claim 21 wherein said front pair of wheels is pivotally movable independently of said rear pair of wheels, each said pair of wheels being pivotable to be positioned in an angular orientation between said longitudinally extending orientation and said transversely extending orientation, said front and rear pairs of wheels being positionable to be directed in a same direction as well as in an opposing direction to provide four wheel steer capability.

* * * * *